(12) United States Patent
Fortman et al.

(10) Patent No.: US 12,116,450 B2
(45) Date of Patent: Oct. 15, 2024

(54) URETHANE EXCHANGE CATALYSTS AND METHODS FOR REPROCESSING CROSS-LINKED POLYURETHANES

(71) Applicants: Northwestern University, Evanston, IL (US); Cornell University, Ithaca, NY (US)

(72) Inventors: David J. Fortman, Pittsburgh, PA (US); William R. Dichtel, Wilmette, IL (US); Daylan T. Sheppard, Evanston, IL (US)

(73) Assignees: Northwestern University, Evanston, IL (US); Cornell University, Ithaca, NY (US)

( * ) Notice: Subject to any disclaimer, the term of this patent is extended or adjusted under 35 U.S.C. 154(b) by 575 days.

(21) Appl. No.: 17/050,138

(22) PCT Filed: Apr. 25, 2019

(86) PCT No.: PCT/US2019/029200
§ 371 (c)(1),
(2) Date: Oct. 23, 2020

(87) PCT Pub. No.: WO2019/210098
PCT Pub. Date: Oct. 31, 2019

(65) Prior Publication Data
US 2021/0095067 A1    Apr. 1, 2021

Related U.S. Application Data

(60) Provisional application No. 62/662,593, filed on Apr. 25, 2018.

(51) Int. Cl.
*C08G 18/82* (2006.01)
*C08G 18/22* (2006.01)
*C08G 18/42* (2006.01)
*C08G 18/48* (2006.01)
*C08G 18/73* (2006.01)
*C08G 18/76* (2006.01)

(52) U.S. Cl.
CPC ....... *C08G 18/7671* (2013.01); *C08G 18/222* (2013.01); *C08G 18/227* (2013.01); *C08G 18/4247* (2013.01); *C08G 18/4833* (2013.01); *C08G 18/73* (2013.01); *C08G 18/82* (2013.01)

(58) Field of Classification Search
CPC ..... C08G 18/222; C08G 18/225; C08G 18/82
See application file for complete search history.

(56) References Cited

U.S. PATENT DOCUMENTS

| 3,684,769 A | 8/1972 | Abbott | |
| 4,657,988 A * | 4/1987 | Sugerman | C08K 5/0091 528/288 |
| 5,525,278 A | 6/1996 | Krosch | |
| 5,587,448 A | 12/1996 | Engen | |
| 2015/0353675 A1 | 12/2015 | Duquenne | |
| 2017/0210055 A1 * | 7/2017 | Xie | B29C 61/003 |
| 2018/0312657 A1 * | 11/2018 | Yue | C08J 11/04 |

FOREIGN PATENT DOCUMENTS

| CN | 107805308 A * | 3/2018 | ........... C08G 18/348 |
| WO | 2001092366 A1 | 12/2001 | |
| WO | 2003008488 A1 | 1/2003 | |
| WO | WO-2018028365 A1 * | 2/2018 | ............ C08F 220/28 |
| WO | 2018045866 A1 | 3/2018 | |

OTHER PUBLICATIONS

CN-107805308-A_Mar. 2018_English.*
WO-2018028365-A1_Feb. 2018_English Translation.*
Azcune, I. et al. Aromatic Disulfide Crosslinks in Polymer Systems: Self-Healing, Reprocessability, Recyclability and More. Eur. Polym. J. 2016, 84, 147-160. https://doi.org/10.1016/j.eurpolymj.2016.09.023.
Brutman, J. P., et al. "Polylactide vitrimers." ACS Macro letters 3.7 (2014): 607-610.
Brutman, J. P., et al. Mechanistic Study of Stress Relaxation in Urethane-Containing Polymer Networks. J. Phys. Chem. B 2019, 123 (6), 1432-1441. https://doi.org/10.1021/acs.jpcb.8b11489.
Capelot, M. et al. "Catalytic control of the vitrimer glass transition." ACS Macro Letters 1.7 (2012): 789-792.
Capelot, M. et al. "Metal-catalyzed transesterification for healing and assembling of thermosets." Journal of the american chemical society 134.18 (2012): 7664-7667.
Chabert, E. et al. Multiple Welding of Long Fiber Epoxy Vitrimer Composites. Soft Matter 2016, 12 (21), 4838-4845. https://doi.org/10.1039/C6SM00257A.
Chen, X.; et al. A Thermally Re-Mendable Cross-Linked Polymeric Material. Science 2002, 295 (5560), 1698-1702. https://doi.org/10.1126/science.1065879.
Colodny, P. C., et al. "Chemorheological Study of Polyurethan Elastomers1." Journal of the American Chemical Society 79.16 (1957): 4320-4323.
Denissen, W.; et al. Vitrimers: Permanent Organic Networks with Glass-like Fluidity. Chem Sci 2016, 7 (1), 30-38. https://doi.org/10.1039/C5SC02223A.
Egorova, K. S.; et al. Which Metals Are Green for Catalysis? Comparison of the Toxicities of Ni, Cu, Fe, Pd, Pt, Rh, and Au Salts. Angew. Chem. Int. Ed. 2016, 55 (40), 12150-12162. https://doi.org/10.1002/anie.201603777.

(Continued)

*Primary Examiner* — Michael L Leonard
(74) *Attorney, Agent, or Firm* — Quarles & Brady LLP

(57) ABSTRACT

Disclosed herein are polyurethane compositions and methods for reprocessing cross-linked polyurethane compositions. The polyurethane composition comprises a network polymer and a polyurethane exchange catalyst permeated within the network polymer. The network polymer comprises a dynamic network formed from an isocyanate constitutional unit and a second constitution unit having a hydroxyl group capable of reacting with an isocyanate group of the isocyanate constitutional unit to form a urethane bond. The catalyst comprises a metal atom and a ligand coordinated to the metal atom.

21 Claims, 18 Drawing Sheets

(56) References Cited

OTHER PUBLICATIONS

Fortman, D. J. et al. Approaches to Sustainable and Continually Recyclable Cross-Linked Polymers. ACS Sustain. Chem. Eng. 2018, 6 (9), 11145-11159. https://doi.org/10.1021/acssuschemeng.8b02355.

Fortman, D. J. et al. Mechanically Activated, Catalyst-Free Polyhydroxyurethane Vitrimers. J. Am. Chem. Soc. 2015, 137 (44), 14019-14022. https://doi.org/10.1021/jacs.5b08084.

Fortman, D. J. et al. Rapidly Reprocessable Cross-Linked Polyhydroxyurethanes Based on Disulfide Exchange. ACS Macro Lett. 2018, 7 (10), 1226-1231. https://doi.org/10.1021/acsmacrolett.8b00667.

Fortman, D. J. et al. Structural Effects on the Reprocessability and Stress Relaxation of Crosslinked Polyhydroxyurethanes. J. Appl. Polym. Sci. 2017, 134 (45), 44984. https://doi.org/10.1002/app.44984.

Heo, Y.; et al. Self-Healing Polyurethanes with Shape Recovery. Adv. Funct. Mater. 2014, 24 (33), 5261-5268. https://doi.org/10.1002/adfm.201400299.

Im ernon, L.; et al. From Landfilling to Vitrimer Chemistry in Rubber Life Cycle. Eur. Polym. J. 2016, 82, 347-376. https://doi.org/10.1016/j.eurpolymj.2016.03.016.

Imbernon, L.; et al. Stress Relaxation and Self-Adhesion of Rubbers with Exchangeable Links. Macromolecules 2016, 49 (6), 2172-2178. https://doi.org/10.1021/acs.macromol.5b02751.

International Searching Authority. International Search Report and Written Opinion for application PCT/US2019/029200. Mailed on Aug. 2, 2019. 13 pages.

Jin, B. et al. Programming a crystalline shape memory polymer network with thermo- and photo-reversible bonds toward a single-component soft robot. Sci. Adv. 2018, 4, eaao3865.

Kloxin, C. J. et al. Covalent Adaptable Networks: Smart, Reconfigurable and Responsive Network Systems. Chem Soc Rev 2013, 42 (17), 7161-7173. https://doi.org/10.1039/C3CS60046G.

Legrand, A.; et al. Silica-Epoxy Vitrimer Nanocomposites. Macromolecules 2016, 49 (16), 5893-5902. https://doi.org/10.1021/acs.macromol.6b00826.

Montarnal, D.; et al. Silica-Like Malleable Materials from Permanent Organic Networks. Science 2011, 334 (6058), 965-968.

Nath, M. Toxicity and the Cardiovascular Activity of Organotin Compounds: A Review. Appl. Organomet. Chem. 2008, 22 (10), 598-612. https://doi.org/10.1002/aoc.1436.

Offenbach, J. A., et al. "Chemical relaxation of stress in polyurethane elastomers." Journal of Colloid Science 11.1 (1956): 39-47.

Pei, Z. et al. Mouldable Liquid-Crystalline Elastomer Actuators with Exchangeable Covalent Bonds. Nat. Mater. 2013, 13 (1), 36-41. https://doi.org/10.1038/nmat3812.

Pei, Z. et al. Regional Shape Control of Strategically Assembled Multishape Memory Vitrimers. Adv. Mater. 2016, 28 (1), 156-160. https://doi.org/10.1002/adma.201503789.

Pretti, C. et al. An Ecotoxicological Study on Tin- and Bismuth-Catalysed PDMS Based Coatings Containing a Surface-Active Polymer. Ecotoxicol. Environ. Saf. 2013, 98, 250-256. https://doi.org/10.1016/j.ecoenv.2013.07.023.

Rottger, M. et al. High-Performance Vitrimers from Commodity Thermoplastics through Dioxaborolane Metathesis. Science 2017, 356 (6333), 62-65.

Sahoo, P. K. et al. Iron-Catalyzed Selective Etherification and Transetherification Reactions Using Alcohols. ACS Omega 2018, 3 (1), 124-136. https://doi.org/10.1021/acsomega.7b01705.

Schellekens, Y., et al. (2014). Tin-free catalysts for the production of aliphatic thermoplastic polyurethanes. Green Chemistry, 16(9), 4401-4407.

Solouki Bonab, V. et al. Ultra-Fast Microwave Assisted Self-Healing of Covalent Adaptive Polyurethane Networks with Carbon Nanotubes. Macromol. Mater. Eng. 2019, 304 (1), 1800405. https://doi.org/10.1002/mame.201800405.

Taynton, P.; et al. Heat- or Water-Driven Malleability in a Highly Recyclable Covalent Network Polymer. Adv. Mater. 2014, 26 (23), 3938-3942. https://doi.org/10.1002/adma.201400317.

Wang, Y.; et al. Reprocessable and Multiple Shape Memory Thermosets with Reconfigurability. Macromol. Rapid Commun. 2019, 1900001. https://doi.org/10.1002/marc.201900001.

Wen, Z.; et al. Reconfigurable LC Elastomers: Using a Thermally Programmable Monodomain to Access Two-Way Free-Standing Multiple Shape Memory Polymers. Macromolecules 2018, 51 (15), 5812-5819. https://doi.org/10.1021/acs.macromol.8b01315.

Yan, P. et al. Multifunctional Polyurethane-Vitrimers Completely Based on Transcarbamoylation of Carbamates: Thermally-Induced Dual Shape Memory Effect and Self-Welding. RSC Adv. 2017, 7 (43), 26858-26866.

Yan, P.; et al. Reconfiguration and shape memory triggered by heat and light of carbon nanotube-polyurethane vitrimer composites. J. Appl. Polym. Sci. 2017, 135, 45784.

Yang, W. et al. Recycling and Disposal Methods for Polyurethane Foam Wastes. Procedia Environ. Sci. 2012, 16, 167-175.

Yu, K.; et al. Influence of Stoichiometry on the Glass Transition and Bond Exchange Reactions in Epoxy Thermoset Polymers. RSC Adv 2014, 4 (89), 48682-48690. https://doi.org/10.1039/C4RA06543C.

Zhang, Z. P. et al. Mechanically Robust, Self-Healable, and Highly Stretchable "Living" Crosslinked Polyurethane Based on a Reversible C—C Bond. Adv. Funct. Mater. 2018, 28 (11), 1706050. https://doi.org/10.1002/adfm.201706050.

Zheng, N., et al. "Catalyst-free thermoset polyurethane with permanent shape reconfigurability and highly tunable triple-shape memory performance." ACS Macro Letters 6.4 (2017): 326-330.

Zheng, N., et al. "Thermoset Shape-Memory Polyurethane with Intrinsic Plasticity Enabled by Transcarbamoylation." Angewandte Chemie International Edition 55.38 (2016): 11421-11425.

Zou, W et al. Dynamic Covalent Polymer Networks: From Old Chemistry to Modern Day Innovations. Adv. Mater. 2017, 29 (14), 1606100. https://doi.org/10.1002/adma.201606100.

Yue, L.; et al. Vitrimerization: A Novel Concept to Reprocess and Recycle Thermoset Waste via Dynamic Chemistry. Global Challenges 2019, 1800076.

Zhai, W.; Kuboki, T.; Wang, L.; Park, C. B.; Lee, E. K.; Naguib, H. E. Cell Structure Evolution and the Crystallization Behavior of Polypropylene/Clay Nanocomposites Foams Blown in Continuous Extrusion. Ind. Eng. Chem. Res. 2010, 49, 9834-9845.

Kim, J.; Gray, M. K.; Zhou, H.; Nguyen, S. T.; Torkelson, J. M. Polymer Blend Compatibilization by Gradient Copolymer Addition during Melt Processing: Stabilization of Dispersed Phase to Static Coarsening. Macromolecules 2005, 38 (4), 16-19.

Geyer, R.; Jambeck, J. R.; Law, K. L. Production, Use, and Fate of All Plastics Ever Made. Sci. Adv. 2017, 3 (7), e1700782.

Zia, K. M.; Bhatti, H. N.; Ahmad Bhatti, I. Methods for Polyurethane and Polyurethane Composites, Recycling and Recovery: A Review. React. Funct. Polym. 2007, 67 (8), 675-692.

Shastri, V. P.; Martin, I.; Langer, R. Macroporous Polymer Foams by Hydrocarbon Templating. Proc. Natl. Acad. Sci. U. S. A. 2000, 97 (5), 1970-1975.

International Search Report and Written Opinion for International Patent Application No. PCT/US2019/029200, dated Aug. 2, 2019.

F. Saint-Michel, L. Chazeau, J. Y. Cavaillé, E. Chabert, Compos. Sci. Technol. 2006, 66, 2700.

A. Paruzel, S. Michałowski, J. Hodan, P. Horák, A. Prociak, H. Bene, ACS Sustain. Chem. Eng. 2017, 5, 6237.

J. Vera-Sorroche, A. Kelly, E. Brown, P. Coates, N. Karnachi, E. Harkin-Jones, K. Li, J. Deng, Appl. Therm. Eng. 2013, 53, 405.

L. M. Matuana, O. Faruk, C. A. Diaz, Bioresour. Technol. 2009, 100, 5947.

Maisonneuve L.; Lamarzelle, O.; Rix, E.; Grau, E.; Cramail, H. Isocyanate-Free Routes to Polyurethanes and Poly(Hydroxy Urethane)S. Chem. Rev. 2015, 115 (22), 12407-12439.J.

A. D'Amico, A. M. Peterson, Addit. Manuf. 2018, 21, 422.

J. A. Reyes-Labarta, A. Marcilla, Ind. Eng. Chem. Res. 2012, 51, 9515.

Kloxin, C. J.; Scott, T. F.; Adzima, B. J.; Bowman, C. N. Covalent Adaptable Networks (CANs): A Unique Paradigm in Cross-Linked Polymers. Macromolecules 2010, 43 (6), 2643-2653.

(56) References Cited

OTHER PUBLICATIONS

J. A. Reyes-Labarta, A. Marcilla, J. Appl. Polym. Sci. 2008, 107, 339.
Eagan, J. M.; Xu, J.; Di Girolamo, R.; Thurber, C. M.; Macosko, C. W.; La Pointe, A. M.; Bates, F. S.; Coates, G. W. Combining Polyethylene and Polypropylene: Enhanced Performance with PE/IPP Multiblock Polymers. Science (80-. ). 2017, 355 (6327), 814-816.
Bates, C. M.; Bates, F. S. 50th Anniversary Perspective: Block Polymers-Pure Potential. Macromolecules 2017, 50 (1), 3-22.
A. Orchel, K. Jelonek, J. Kasperczyk, P. Dobrzynski, A. Marcinkowski, E. Pamula, J. Orchel, I. Bielecki, A. Kulczycka, Biomed Res. Int. 2013, 2013, 176946.
N. V. Gama, A. Ferreira, A. Barros-Timmons, Materials 2018, 11, 1841.
N. Zheng, Z. Fang, W. Zou, Q. Zhao, T. Xie, Angew. Chem. Int. Ed. 2016, 128, 11593.
Todd, A. D.; Mceneany, R. J.; Topolkaraev, V. A.; Macosko, C. W.; Hillmyer, M. A. Reactive Compatibilization of Poly (Ethylene Terephthalate) and High-Density Polyethylene Using Amino-Telechelic Polyethylene. Macromolecules 2016, 49 (23), 8988-8994.
Martin, R.; Rekondo, A.; Ruiz De Luzuriaga, A.; Santamaria, A.; Odriozola, I. Mixing the Immiscible: Blends of Dynamic Polymer Networks. RSC Adv. 2015, 5 (23), 17514-17518.
Zhang, B.; Yuan, C.; Zhang, W.; Dunn, M. L.; Qi, H. J.; Liu, Z.; Yu, K.; Ge, Q. Recycling of Vitrimer Blends with Tunable Thermomechanical Properties. RSC Adv. 2019, 9 (10), 5431-5437.
Budsaereechai, S.; Hunt, A. J.; Ngernyen, Y. Catalytic Pyrolysis of Plastic Waste for the Production of Liquid Fuels for Engines. RSC Adv. 2019, 9 (10), 5844-5857.
Helms, B. A.; Russell, T. P. Reaction: Polymer Chemistries Enabling Cradle-to-Cradle Life Cycles for Plastics. Chem 2016, 1 (6), 816-818.
Wahab, D. A.; Hussain, A.; Scavino, E.; Mustafa, M. M.; Basri, H. Development of a Prototype Automated Sorting System for Plastic Recycling D . A . Wahab , A . Hussain , E . Scavino , M . M . Mustafa and H . Basri. 2006, 3 (7), 1924-1928.
Anastasaki, A.; Oschmann, B.; Willenbacher, J.; Melker, A.; Van Son, M. H. C.; Truong, N. P.; Schulze, M. W.; Discekici, E. H.; McGrath, A. J.; Davis, T. P.; Bates, C. M.; Hawker, C. J. One-Pot Synthesis of ABCDE Multiblock Copolymers with Hydrophobic, Hydrophilic, and Semi-Fluorinated Segments. Angew. Chemie—Int. Ed. 2017, 56 (46), 14483-14487.
Gody, G.; Barbey, R.; Danial, M.; Perrier, S. Ultrafast RAFT Polymerization: Multiblock Copolymers within Minutes. Polym. Chem. 2015, 6 (9), 1502-1511.
Macosko, C. W.; Guegan, P.; Khandpur, A. K.; Nakayama, A.; Marechal, P.; Inoue, T. Compatibilizers for Melt Blending: Premade Block Copolymers. Macromolecules 1996, 29 (17), 5590-5598.
Lau, T. H. M.; Wong, L. L. C.; Lee, K. Y.; Bismarck, A. Tailored for Simplicity: Creating High Porosity, High Performance Bio-Based Macroporous Polymers from Foam Templates. Green Chem. 2014, 16 (4), 1931-1940.
J. DiGangi, J. Strakova, IPEN 2011.
Blank, W. J.; He, Z. A.; Hessell, E. T. Catalysis of the Isocyanate-Hydroxyl Reaction by Non-Tin Catalysts. Prog. Org. Coat. 1999, 35, 19-29. https://doi.org/10.1016/S0300-9440(99)00006-5.
Nandurkar, N.S.; Patil, D.S .; Bhanage, B. M. Ultrasound Assisted Synthesis of Metal-1,3-Diketonates. Inorg. Chem. Commun. 2008, 11, 733-736. https://doi.org/10.1016/j.inoche.2008.03.014.
Meng, F.; Pritchard, R. H.; Terentjev, E. M. Stress Relaxation, Dynamics, and Plasticity of Transient Polymer Networks. Macromolecules 2016, 49, 2843-2852. https://doi.org/10.1021/acs.macromol.5b02667.
Snyder, R. L.; Fortman, D. J.; De Hoe, G. X.; Hillmyer, M. A.; Dichtel, W. R. Reprocessable Acid-Degradable Polycarbonate Vitrimers. Macromolecules 2018, 51, 389-397. https://doi.org/10.1021/acs.macromol.7b02299.
Willocq, B.; Khelifa, F.; Brancart, J.; Van Assche, G.; Dubois, Ph.; Raquez, J.-M. One-Component Diels-Alder Based Polyurethanes: A Unique Way to Self-Heal. RSC Adv 2017, 7, 48047-48053. https://doi.org/10.1039/C7RA09898G.
Mcbride, M. K.; Worrell, B. T.; Brown, T.; Cox, L. M.; Sowan, N.; Wang, C.; Podgorski, M.; Martinez, A. M.; Bowman, C. N. Enabling Applications of Covalent Adaptable Networks. Annu. Rev. Chem. Biomol. Eng. 2019, 10, 175-198. https://doi.org/10.1146/annurev-chembioeng-060718-030217.
Jin, M. et al., Neural Regen Res. 2012, 7 (28), 2213-2220.
Herrera, D.; Zamora, J. C.; Bello, A.; Grimau, M.; Laredo, E.; Muller, A. J.; Lodge, T. P. Miscibility and Crystallization in Polycarbonate/Poly(&-Caprolactone) Blends: Application of the Self-Concentration Model. Macromolecules 2005, 38 (12), 5109-5117.
Allo, B. A; Rizkalla, A. S.; Mequanint, K. Synthesis and Electrospinning of E-Polycaprolactone-Bioactive Glass Hybrid Biomaterials via a Sol-Gel Process. Langmuir 2010, 26 (23), 18340-18348.
Loo, Y. L.; Register, R. A.; Adamson, D. H. Direct Imaging of Polyethylene Crystallites within Block Copolymer Microdomains. J. Polym. Sci. Part B Polym. Phys. 2000, 38 (19), 2564-2570.

* cited by examiner

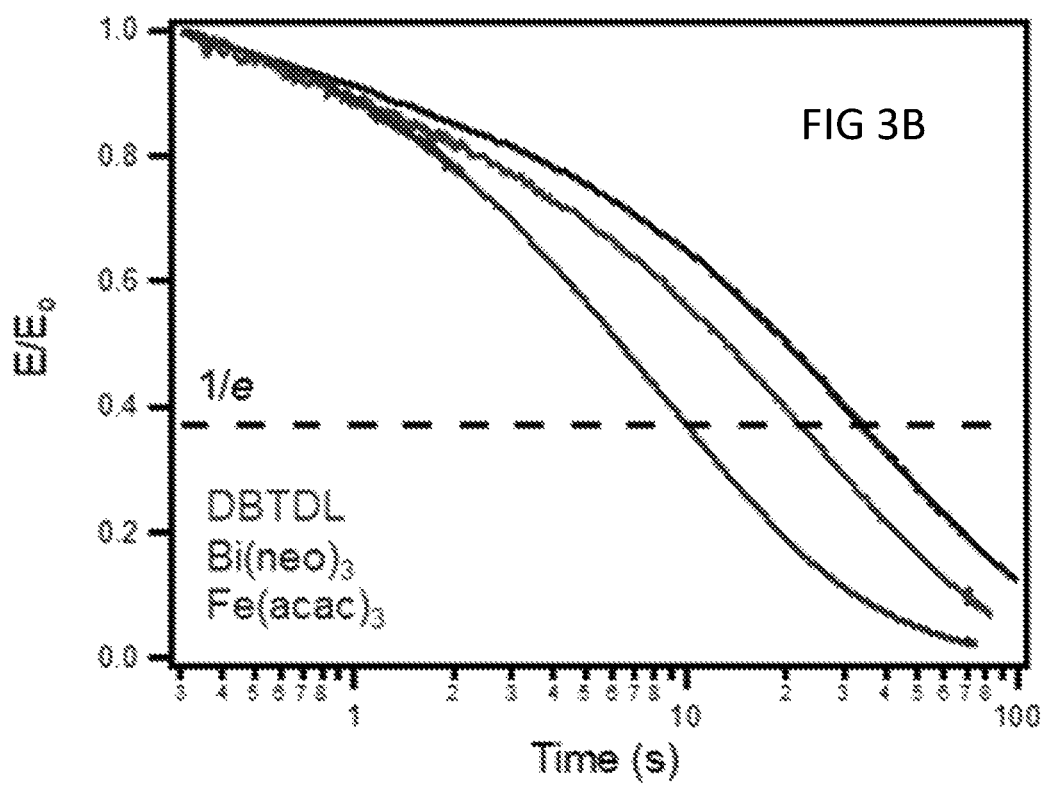
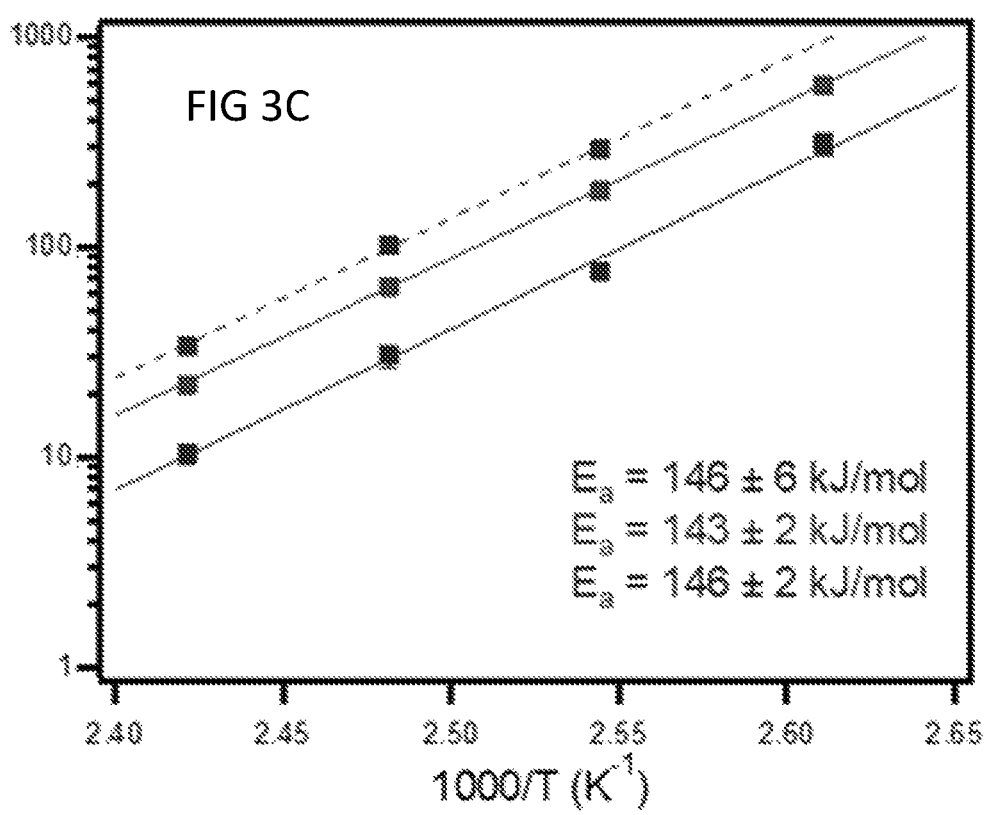

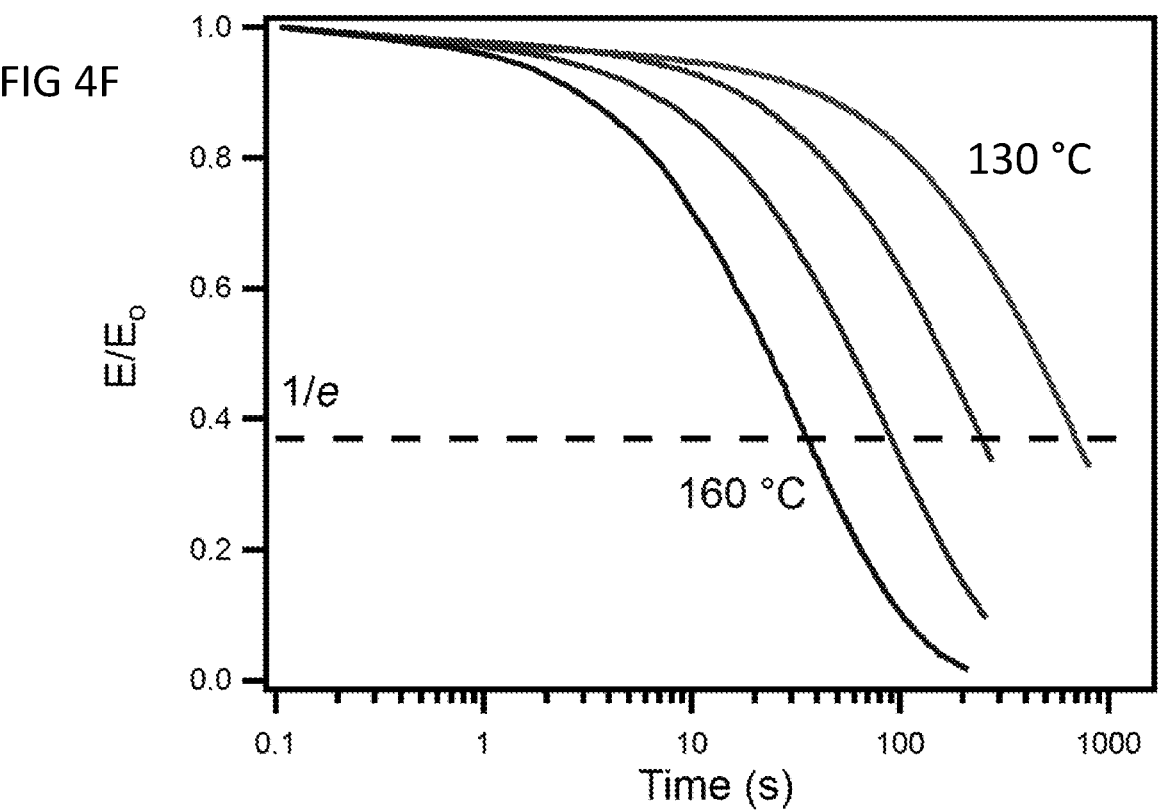

URETHANE EXCHANGE CATALYSTS AND METHODS FOR REPROCESSING CROSS-LINKED POLYURETHANES

CROSS-REFERENCE TO RELATED APPLICATIONS

The present application represents the U.S. national stage entry of International Application PCT/US2019/029200, filed Apr. 25, 2019 which claims priority to U.S. Provisional Patent Application No. 62/662,593 that was filed Apr. 25, 2018, the contents of each are hereby incorporated by reference.

STATEMENT REGARDING FEDERALLY SPONSORED RESEARCH

This invention was made with government support under CHE-1413862 awarded by the National Science Foundation. The government has certain rights in the invention.

BACKGROUND OF THE INVENTION

Many cross-linked polymers are not recyclable. Incorporating dynamic covalent bonds into polymer networks can lead to materials that possess mechanical properties competitive with traditional static thermosets while displaying recyclability commonly associated with thermoplastics. Many dynamic covalent bonds, including imines, boronic esters, disulfides, and reversible Diels-Alder adducts have been incorporated into cross-linked polymer networks and been shown to enable their reprocessing. Although these approaches will potentially enable new technologies or sustainable reuse of cross-linked materials, these linkages are uncommon in commodity polymers such as polyurethanes (PUs).

Polyurethanes (PUs) are the sixth largest class of polymers used worldwide, and are commonly used in cross-linked architectures as foams, adhesives, coatings, and structural components. The direct bulk reprocessing of PUs into similar value materials is not well-developed. Due to their large scale use, much work has focused on the repurposing or recycling of cross-linked PU waste, although most approaches rely on chemical recycling via glycolysis to produce new PU polyol oligomers or blending with thermoplastic polymers. Incorporation of other dynamic bonds into PUs is one strategy to directly recycle these cross-linked materials. Another strategy is to control the dynamic nature of urethane linkages to enable recycling of these materials on large scale. Tobolsky and coworkers demonstrated that urethane dissociation to isocyanates and alcohols at elevated temperatures causes cross-linked PUs to relax stress, [Offenbach, J. A. et al., *J. Colloid Sci.* 1956, 11, 39-47; Colodny, P. C. et al., *J. Am. Chem. Soc.* 1957, 79 (16), 4320-4323] a phenomenon which has recently been recognized as a feature of other useful dynamic cross-linked polymers. More recently, Xie and coworkers showed that incorporation of catalytic dibutyltin dilaurate (DBTDL)[Zheng, N. et al., *Angew. Chem. Int. Ed.* 2016, 55 (38), 11421-11425] or tertiary amines[Zheng, N. et al., *ACS Macro Lett.* 2017, 6 (4), 326-330] into cross-linked PUs causes more rapid stress relaxation via urethane exchange reactions (FIG. 1). Further work has demonstrated that tin-mediated urethane exchange is a way to achieve stress relaxation and some degree of reprocessability in cross-linked polyurethanes. [Yan, P. et al., *RSC Adv.* 2017, 7 (43), 26858-26866; Brutman, J. P. et al., *J. Phys. Chem. B* 2019, 123 (6), 1432-1441; Wen, Z. et al. *Macromolecules* 2018, 51 (15), 5812-5819; Wang, Y. et al., *Macromol. Rapid Commun.* 2019, 1900001; Solouki Bonab, V. et al., *Macromol. Mater. Eng.* 2019, 304 (1), 1800405] However, alkyl tin species are well-known to have harmful health and environmental effects. As a result, there is a need for improved, safer materials and methods for controlling the dynamic nature of linkages prevalent in commodity PUs for direct reprocessing of these materials.

BRIEF SUMMARY OF THE INVENTION

Disclosed herein are polyurethane compositions and methods for reprocessing cross-linked polyurethane compositions. The polyurethane composition may comprise a network polymer and a polyurethane exchange catalyst permeated within the network polymer. The network polymer may comprise a dynamic network formed from an isocyanate constitutional unit and a second constitution unit having a hydroxyl group capable of reacting with an isocyanate group of the isocyanate constitutional unit to form a urethane bond. The polyurethane exchange catalyst may comprise a metal selected from Bi, Fe, Zr, Ti, Hf, Al, Zn, Cu, Ni, Co, Mn, V, Sc, Y, Ce, or Mo and a ligand coordinated with the metal atom. Suitably a mol % of the polyurethane exchange catalyst to total isocyanate functionality is less or equal to 5 mol %. In some embodiments, the catalyst comprises Bi(neo)3, Fe(acac)3, Ti(OiPr)2(acac)2, Hf(acac)4, Zr(acac)4, Mn(acac)2, Bi(oct)3, Zn(tmhd)2, Zr(tmhd)4, or any combination thereof. Suitably the network polymer may be formed in the presence of the catalyst. In other embodiments, the network polymer is formed in the presence of the catalyst.

In some embodiments, the second constitutional unit is a prepolymer molecule comprising a polyether, a polyester, a polycarbonate, a polyacrylate, a polyolefin, a polybutadiene, a polysulfide, or a polysiloxane. In certain embodiments, the second constitutional unit comprise a polyether or a polyester.

In some embodiments, the second constitutional unit is a branch unit having at least three hydroxyl groups each capable of reacting with the isocyanate group of the first constitutional unit to form the urethane bond. Suitably the second constitutional unit may further comprise one or more molecules selected from a polyether, a polyester, a polycarbonate, a polyacrylate, a polyolefin, a polybutadiene, a polysulfide, a polysiloxane, a plant-based oil, an alcohol, or an amine.

In some embodiments, the isocyanate constitutional unit is an aromatic isocyanate constitutional unit. Suitably, the isocyanate constitutional unit comprises two isocyanate groups.

Another aspect of the invention is a method for preprocessing polyurethane compositions. The method may comprise providing any of the polyurethane compositions described herein, heating the polyurethane composition to an effective bond-exchange temperature, and applying mechanical force to the polyurethane composition for an effective bond-exchange time. In some embodiments, the effective bond-exchange temperature is less than or equal to 200° C., optionally less than or equal to 160° C. In some embodiments, the effective bond-exchange time is less than or equal to 30 minutes, optionally less than or equal to 12 minutes. The method may further comprise post-synthetically impregnating the network polymer with the catalyst, thereby providing the polyurethane composition. In some embodiments, the method further comprises mechanically processing the network polymer prior to impregnation.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 3B shows stress relaxation analysis of polyether PUs containing 1 mol % Bi(neo)3 (bottom), DBTDL (middle), and Fe(acac)3 (upper) performed at 140° C.

FIG. 3C shows Arrhenius plots of characteristic relaxation time of polyether PUs containing 1 mol % $Bi(neo)_3$ (bottom; $E_a=146\pm6$ kJ/mol), DBTDL (middle; $E_a=143\pm2$ kJ/mol), and $Fe(acac)_3$ (top; $E_a=146\pm2$ kJ/mol). The line for samples containing $Fe(acac)_3$ is dashed since decomposition occurs during the relaxation process.

FIG. 4F shows representative stress relaxation curves of MDI polyester PU with 1 mol % $Fe(acac)_3$ performed from 130 to 160° C.

DETAILED DESCRIPTION OF THE INVENTION

Figure 1:
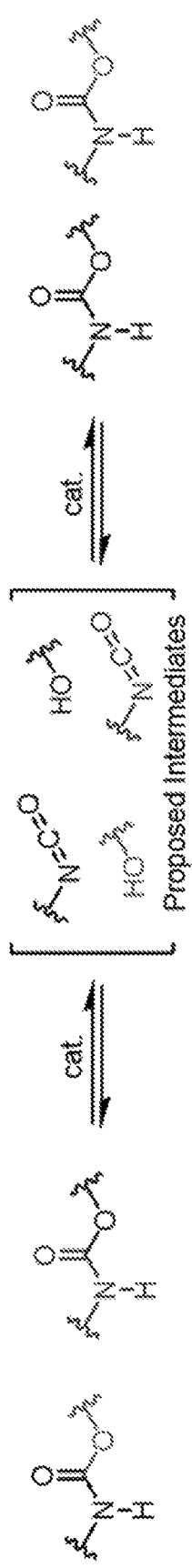
FIG. 1 provides a schematic of the urethane exchange process.

The reprocessing or recycling of cross-linked polymers by incorporating dynamic covalent cross-links has the potential to increase the sustainability associated with using these materials. Polyurethanes (PUs) are the largest class of polymers commonly used in cross-linked form; however, their direct recycling into similar value materials is not well-developed. We demonstrate that a variety of Lewis acid catalysts can mediate the exchange of urethane bonds selectively and at relatively mild conditions. Incorporating these catalysts into cross-linked polyether and polyester PUs with structures similar to commercial PUs gives cross-linked materials that relax stress very rapidly compared to most vitrimer networks at elevated temperatures. Due to their dynamic nature, these polymers can be reprocessed, for example, via compression molding to give materials with similar cross-linking densities, despite their covalently cross-linked architecture.

Several definitions are provided to assist with the understanding of the technology.

"Block" means a portion of a macromolecule, comprising many constitutional units, that has at least one constitutional or configurational feature which is not present in the adjacent portions.

"Branch" means an oligomeric or polymeric offshoot from a macromolecular chain.

"Branch point" means a point on a chain at which a branch is attached.

"Branch unit" means a constitutional unit containing a branch point.

"Catalyst" means a substance that increases the rate of a reaction without modifying the overall Gibbs energy change in the reaction. Suitably the catalyst may be a coordination entity comprising a central atom and one or more ligands joined to the central atom. Suitably the central atom is a metal. "Ligand" means an atom or group joined to a central atom.

"Chain" means a whole or part of a macromolecule, an oligomer molecule, or a block, comprising a linear or branched sequence of constitutional units between two boundary constitutional units, each of which may be either an end-group, a branch point, or an otherwise-designated characteristic feature of the macromolecule.

"Constitutional unit" means an atom or group of atoms (with pendant atoms or groups, if any) comprising a part of the essential structure of a macromolecule, an oligomer molecule, a block, or a chain.

"Covalent network" or "covalent polymer network" means a network in which the permanent paths through the structure are all formed by covalent bonds.

"Dynamic network" or "dynamic polymer network" means a covalent network that is capable undergoing bond-exchange reactions at a temperate above an effective bond-exchange temperature. A dynamic network may demonstrate viscoelastic liquid properties above the freezing transition temperature.

"Effective bond-exchange temperature" means a temperature above the freezing transition temperature. The "freezing transition temperature" is the temperature where a material transitions from a viscoelastic solid to a viscoelastic liquid. The effective bond-exchange temperature is lower than the temperature where the dynamic network undergoes irreversible thermal instability or degradation. In some embodiments, the effective bond-exchange temperature is greater than the freezing transition temperature and less than or equal to 275° C. Suitably the effective bond-exchange temperature may be less than or equal to 250° C., 225° C., 200° C., 190° C., 180° C., 170° C., 160° C., 150° C., 140° C., 130° C., 120° C., 110° C., or less than 110° C.

"Effective bond-exchange time" means a time sufficient for urethane-bond exchange reactions to occur. The effective bond-exchange time may be determined by monitoring the stress decay of a polyurethane composition. Suitably, a minimum effective bond-exchange time may be determined as the time necessary for the stress relaxation modulus to relax to at least 37% (1/e) of its initial value. In some embodiments, the effective bond-exchange time is less than or equal to 60 minutes. Suitably the effective bond-exchange time may be less than 50 minutes, 45 minutes, 40 minutes, 35 minutes, 30 minutes, 25 minutes, 20 minutes, 15 minutes, 12 minutes, 10 minutes, or less than 10 minutes.

"Inorganic polymer" means a polymer or polymer network with a skeletal structure that does not include carbon atoms. Examples include, without limitation, polyphosphazenes, polysilicates, polysiloxanes, polysilanes, polysilazanes, polygermanes, and polysulfides.

"Isocyanate constitutional unit" means a constitutional unit comprising at least one isocyanate group, i.e., —NCO. Suitably the isocyanate constitutional unit may comprise more than one isocyanate group such as two, three, or four isocyanate groups. In some embodiments, the isocyanate constitutional unit is an aromatic isocyanate constitutional unit. As used herein, an "aromatic isocyanate constitutional unit" means an isocyanate constitutional unit having an isocyanate group pendant from an aryl group such a phenyl or other aromatic ring.

"Lewis acid" means a molecular entity (and the corresponding chemical species) that is an electron-pair acceptor and therefore able to react with a Lewis base to form a Lewis adduct, by sharing the electron pair furnished by the Lewis base.

"Linear chain" means a chain with no branch points between the boundary units.

"Macromolecule" or "polymer molecule" means a molecule of high relative molecular mass, the structure of which essentially comprises the multiple repetition of units derived, actually or conceptually, from molecules of low relative molecular mass.

"Mechanically processed" means to mechanically alter a substance, e.g., by mechanically grinding, cutting, chopping, or applying some other form of mechanical force. Suitably, the substance such as the polyurethane compositions described herein may be mechanically processed to fragment the substance into pieces or grains.

"Monomer" means a substance composed of monomer molecules.

"Monomer molecule" means a molecule which can undergo polymerization, thereby contributing constitutional units to the essential structure of a macromolecule.

"Monomeric unit" means the largest constitutional unit contributed by a single monomer molecule to the structure of a macromolecule or oligomer molecule.

"Network" means a highly ramified macromolecule in which essentially each constitutional unit is connected to each other constitutional unit and to the macroscopic phase boundary by many permanent paths through the macromolecule, the number of such paths increasing with the average number of intervening bonds; the paths must on the average be co-extensive with the macromolecule.

"Network polymer" means a polymer composed of one or more networks.

"Oligomer molecule" means a molecule of intermediate relative molecular mass, the structure of which essentially comprises a small plurality of units derived, actually or conceptually, from molecules of lower relative molecular mass.

"Organic polymer" means a polymer or polymer network with a skeletal structure that includes carbon atoms. Examples include, without limitation, polyethers, polyesters, polycarbonates, polyacrylates, polyolefins, and polybutadienes.

"Polymer" means a substance composed of macromolecules.

"Polymerization" means a process of converting a monomer or a mixture of monomers into a polymer.

"Prepolymer molecule" means a macromolecule or oligomer molecule capable of entering, through reactive groups, into further polymerization, thereby contributing more than one constitutional unit to at least one type of chain of the final macromolecules.

"Polyurethane composition" means a dynamic network formed from urethane bonds that are capable of undergoing urethane bond-exchange reactions. The polyurethane compositions comprise a network urethane-containing polymer and a polyurethane exchange catalyst permeated within the network polymer. The network polymer may be formed from isocyanate constitutional units and a second constitutional unit having hydroxyl groups capable of reacting with the isocyanate group of the isocyanate constitutional unit. The mol % of the polyurethane exchange catalyst to the total isocyanate functionality may be less than or equal to 5 mol %. Suitable, the mol % may be less than or equal 4 mol %, 3 mol %, 2 mol %, 1 mol %, or less than 1 mol %. The second constitutional unit may be a prepolymer molecule or a branch unit. Suitably the second constitutional unit may function as both a prepolymer molecule and a branch unit. The prepolymer molecule is an organic polymer molecule or an inorganic polymer molecule such as a polyether, a polyester, a polycarbonate, a polyacrylate, a polyolefin, a polybutadiene, a polysulfide, or a polysiloxane having one or more hydroxyl groups capable of reacting with an isocyanate group. When the prepolymer molecule also functions as a branch unit, the prepolymer molecule has a three or more hydroxyl groups capable of reacting with isocyanate groups and typically a plurality of hydroxyl groups in proportion to the number of constitutional units of the prepolymer molecule. The network polymer may also be formed from urethane-containing monomers featuring other polymerizable groups, including but not limited to, acrylates, methacrylates, or other polymerizable olefins.

"Polyurethane exchange catalyst" means a catalyst that increases the rate of a polyurethane bond-exchange reaction. Suitable metal for the catalyst include Bi, Fe, Zr, Ti, Hf, Al, Zn, Cu, Ni, Co, Mn, V, Sc, Y, Ce, or Mo. Suitable ligands for the catalyst include, without limitation, branched or unbranched, substituted or unsubstituted carboxylates, alkoxides, 1,3-diketones, 1,2-diketones, sulfonates, sulfonamides, amimes, diamines, carbonates, phosphates, nitrates, halides, catecholates, hydroxamates, hydroxides, or any combination thereof. The ligand may be branched or unbranched, substituted or unsubstituted. Exemplary ligands include acetylacetonate (acac), isopropoxide (OiPr), neodecanoate (neo), laurate, ethylhexanoate, and 2,2,6,6-Tetramethyl-3,5-heptanedione (tmhd), trifluoromethanesulfonate, trifluoromethanesulfonamide, cyclopentadiene, pyridine salicylidene diamine, phosphine, or any combination thereof.

"Subchain" means an arbitrarily chosen contiguous sequence of constitutional units, in a chain.

"Thermosetting polymer" or "thermoset" is a polymer that is irreversibly hardened by curing from a soft solid of viscous liquid prepolymer or resin.

"Vitrimer" means a network polymer that can change its topology by thermally activated bond-exchange reactions. At elevated temperatures, the bond-exchange reactions occur at an effectively rapid rate and the network polymer has properties of a viscoelastic liquid. At low temperatures, the bond-exchange reactions are slowed and the network polymer behaves like a thermosetting polymer.

Figure 2A:
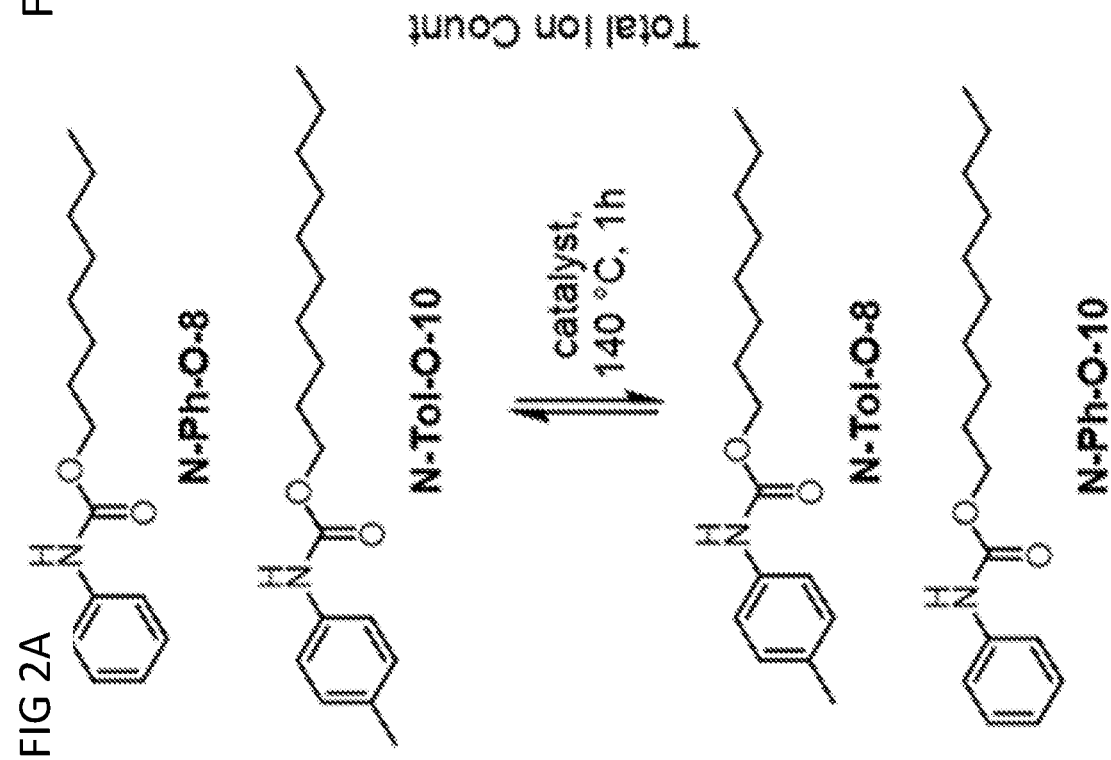
FIG. 2A illustrates urethane exchange of N-phenyl-O-octyl urethane and N-toly-O-decyl urethane to generate N-tolyl-O-octyl urethane and N-phenyl-O-decyl urethane.
Figure 2B:
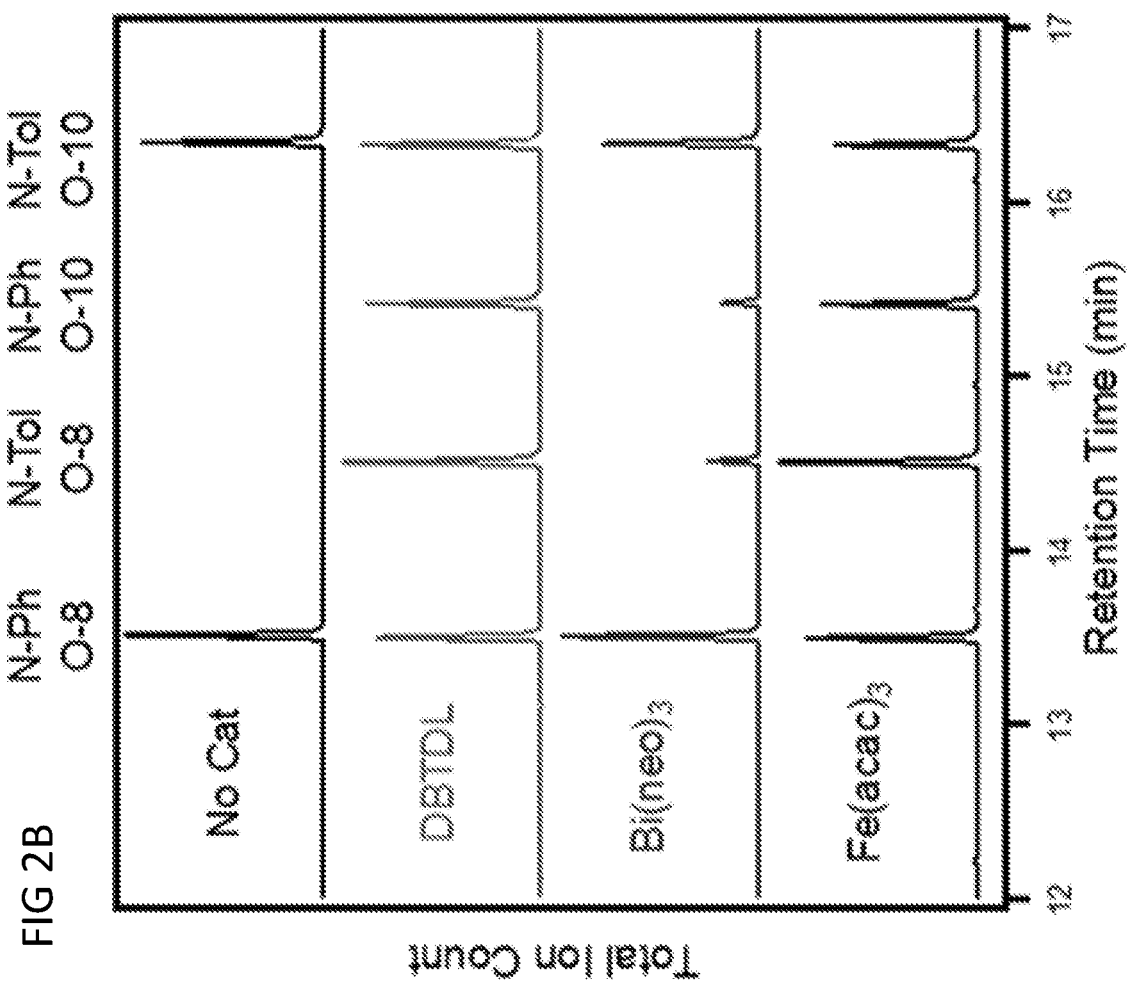
FIG. 2B provides gas chromatograms of the reaction mixture N-phenyl-O-octyl urethane and N-toly-O-decyl taken after heating for 1 hour in the presence or absence of 2.5 mol % catalyst at 140° C. The appearance of N-tolyl-O-octyl urethane (RT=14.52 min) and N-phenyl-O-decyl urethane (RT=15.43 min) are the result of urethane-urethane exchange.
Figure 2C:
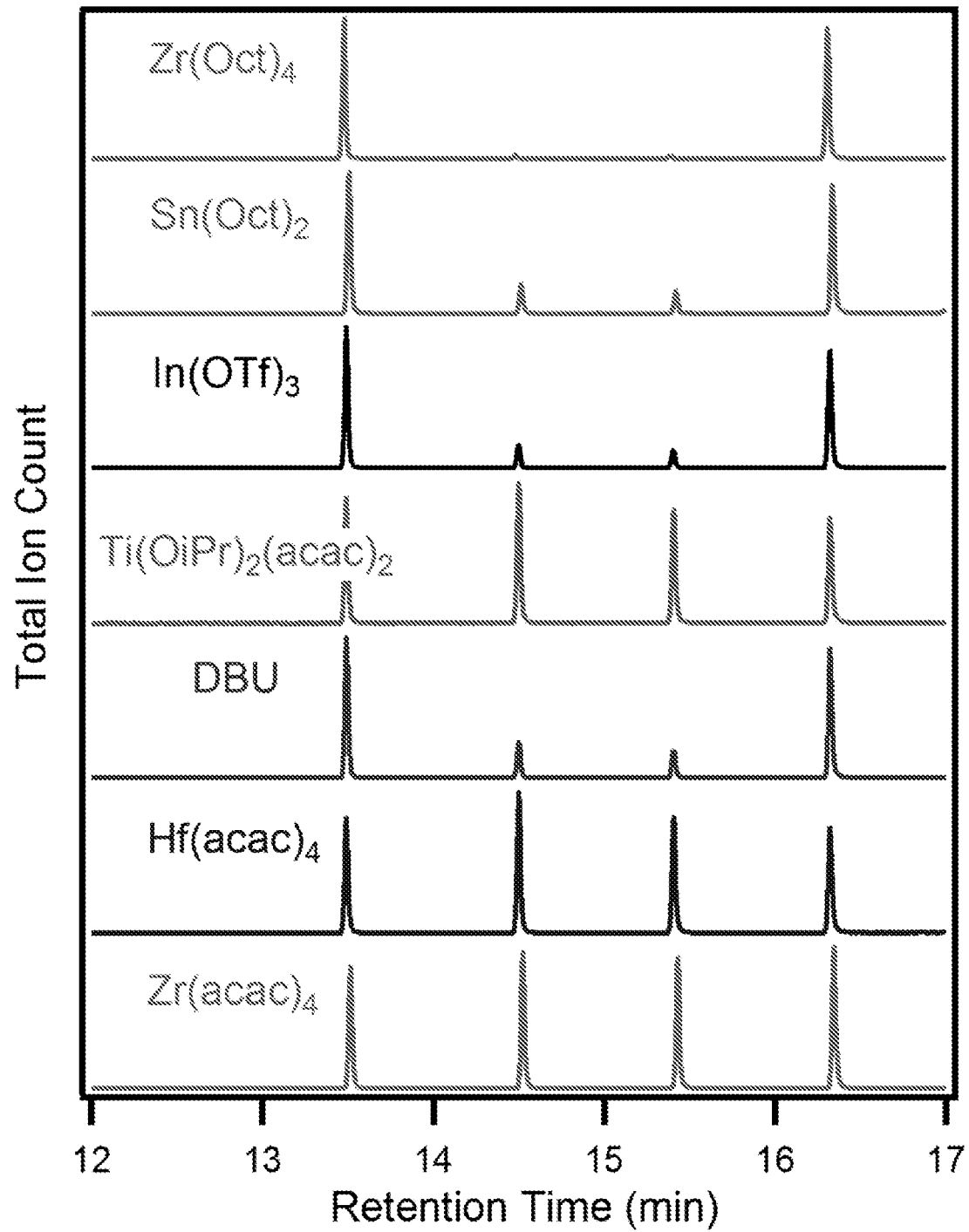
FIG. 2C shows normalized gas chromatograms of mixture of N-phenyl-O-octyl urethane (RT=13.51 min) and N-tolyl-O-decyl (RT=16.34 min) urethane heated to 140° C. for 1 h in the presence of 2.5 mol % catalyst. The appearance of N-tolyl-O-octyl urethane (RT=14.52 min) and N-phenyl-O-decyl urethane (RT=15.43 min) are the result of urethane-urethane exchange.
Figure 2D:
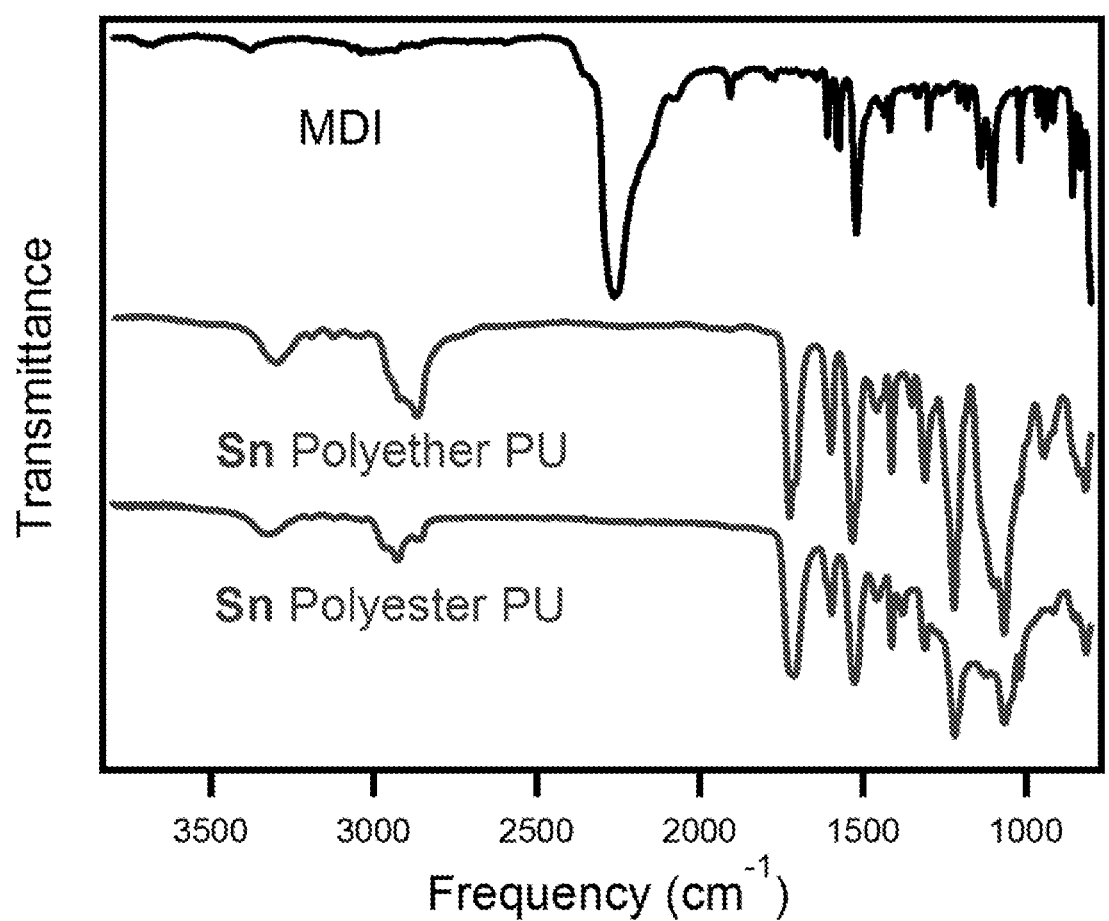
FIG. 2D shows FT-IR spectra of 4,4'-methylenebis(phenylisocyanate) (top), and polyether (middle) and polyester polyurethanes (bottom) synthesized with 1 mol % DBTDL, showing complete disappearance of —NCO stretch at 2285 $cm^{-1}$.

Stress relaxation of cross-linked PUs has been shown to occur on slow, multiple-hour timescales in the absence of catalyst or very rapidly (seconds to minutes) in the presence of DBTDL. [Zheng 2016; Yan 2017] DBTDL and other alkyl tin species are well-known to have harmful health and environmental effects, and would not be ideal for large scale incorporation at high concentrations in PU resins. Therefore, catalyst lacking an alkyl tine species were sought. To evaluate catalyst performance, N-phenyl-O-octyl urethane and N-tolyl-O-decyl urethane were combined with 2.5 mol % of catalyst relative to urethane and heated at 140° C. for 1 hour. The mixture was then analyzed via GC-MS to determine whether the exchange products, N-phenyl-O-decyl urethane and N-tolyl-O-octyl urethane, were formed (FIG. 2A-2B). In the absence of catalyst, only the two starting materials are observed, consistent with slow stress relaxation observed in cross-linked PUs containing no additional catalyst. Use of DBTDL as a catalyst yielded a mixture of the four urethanes, an equilibrium mixture. A variety of Lewis acid catalysts and organocatalysts were screened, and many catalysts showed comparable activity to DBTDL in catalyzing this reaction. Zirconium(IV) acetylacetonate, iron(III) acetylacetonate, titanium(IV) diisopropoxide bis(acetyacetonate), and hafnium(IV) acetylacetonate showed apparent equilibration within 1 hour (FIG. 2B-2C). Stannous ethylhexanoate, indium (III) triflate, and zirconium(IV) ethylhexanoate showed much lower or no conversion (FIG. 2C), suggesting that both the identity of the metal and its ligands play an important role in the catalyst's efficiency. There exists a positive correlation between a given catalyst's urethane exchange activity and its reported activity for catalyzing the reaction of isocyanates with alcohols, [Schellekens, Y. et al., *Green Chem* 2014, 16 (9), 4401-4407] which may support the reversion based mechanism of exchange.

We next studied the performance of various catalysts having lower toxicity than DBTDL incorporated into PU networks. Examples include bismuth neodecanoate [Bi(neo)$_3$] and iron(III) acetylacetonate [Fe(acac)$_3$]. These catalysts were incorporated into both polyether- and polyester-based PUs, as these functional groups are common in commercial cross-linked PU materials.

Figure 3A:
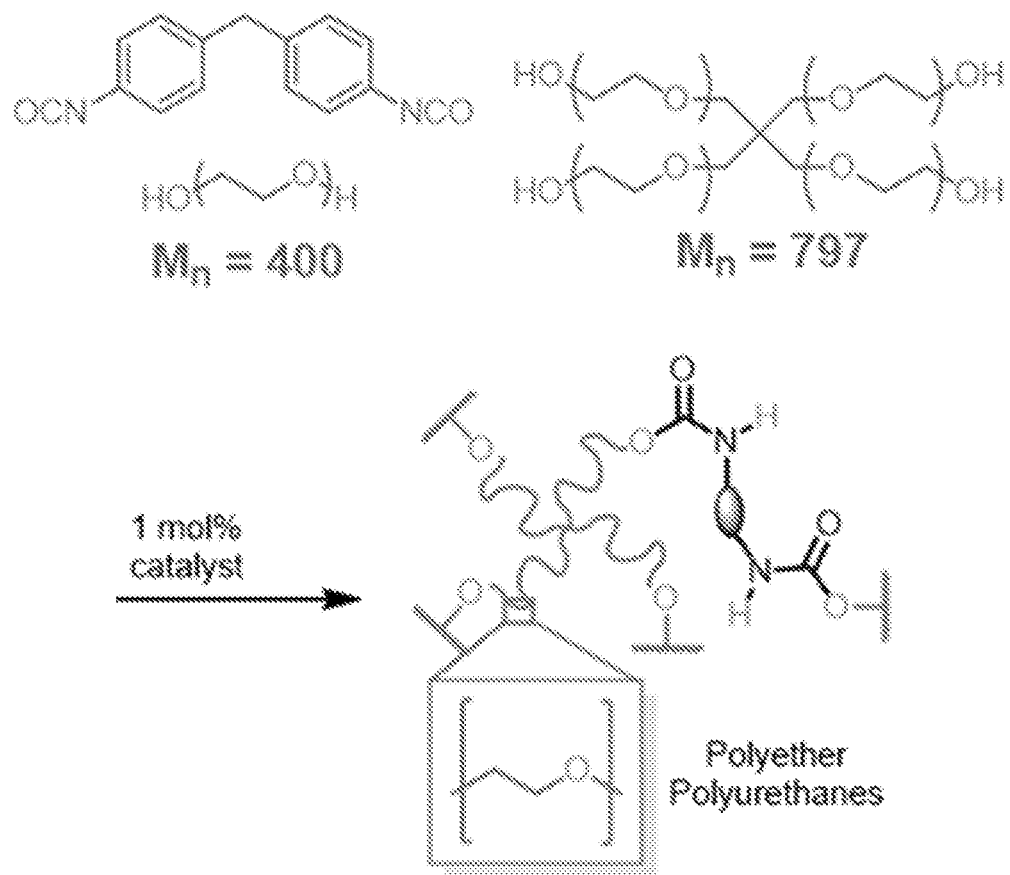
FIG. 3A illustrates the synthesis of polyether PUs.
Figure 3D:
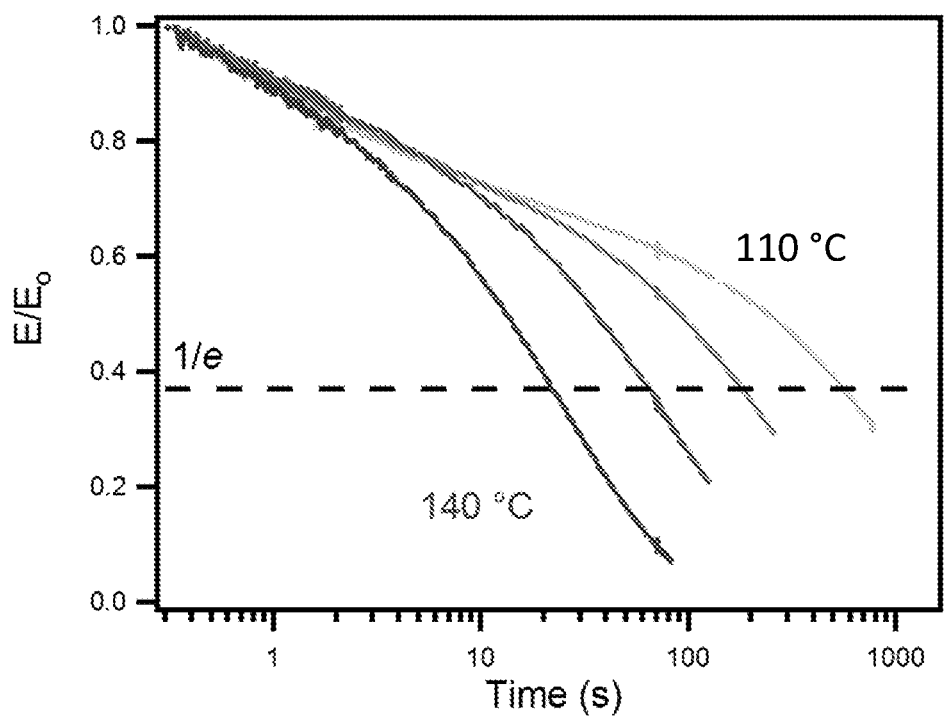
FIG. 3D shows representative stress relaxation curves of polyether PU with 1 mol % DBTDL performed from 110 to 140° C.
Figure 3E:
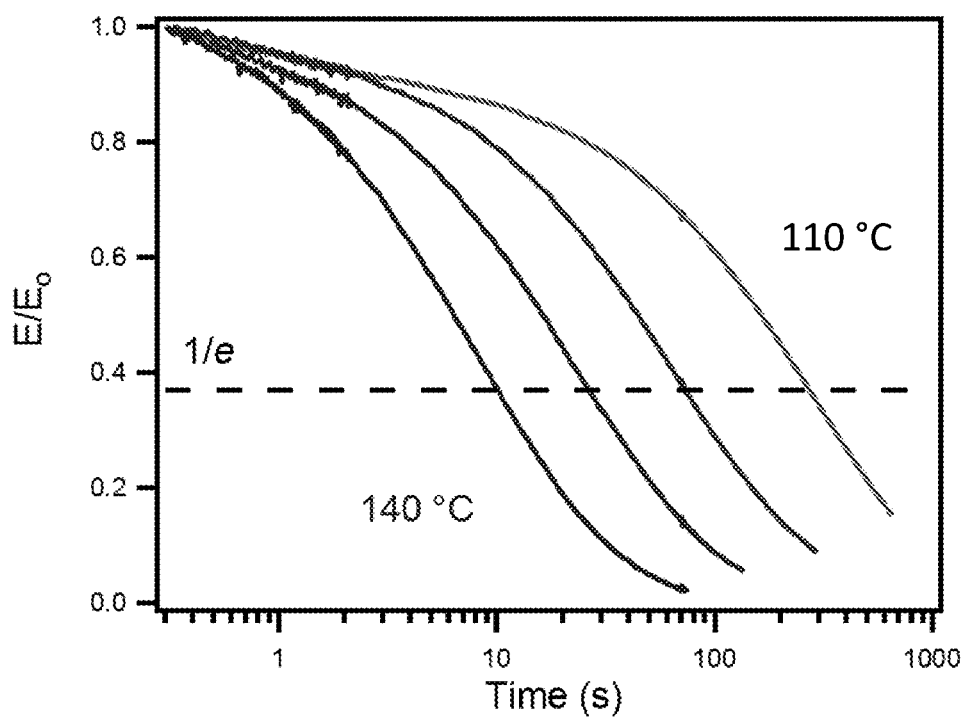
FIG. 3E shows representative stress relaxation curves of polyether PU with 1 mol % $Bi(neo)_3$ performed from 110 to 140° C.
Figure 3F:
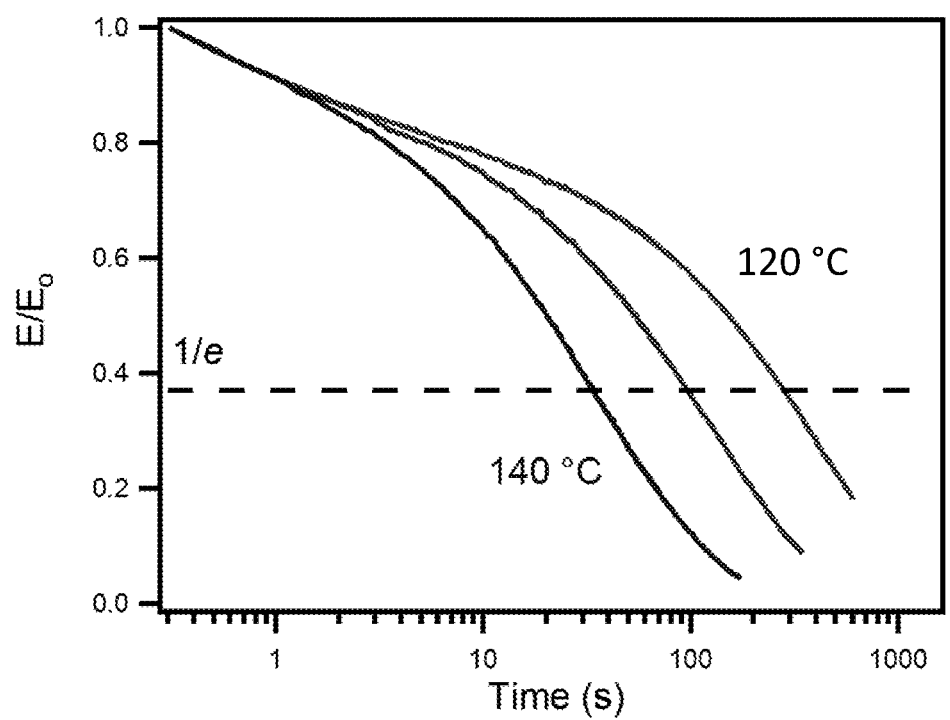
FIG. 3F shows representative stress relaxation curves of polyether PU with 1 mol % $Fe(acac)_3$ performed from 120 to 140° C.

Cross-linked polyether PU elastomers were synthesized by reacting 4,4'-methylenebis(phenyl isocyanate) (MDI) with a linear polyethylene glycol (PEG, $M_n \approx 400$ g/mol) and a 4-arm hydroxyl-terminated PEG ($M_n \approx 797$ g/mol) in the presence of 1 mol % catalyst (FIG. 3A). FT-IR spectroscopy of the cured polymers indicates complete disappearance of the —NCO stretching band (2285 cm$^{-1}$), and the appearance of both the urethane C=O stretching frequency (1690-1715 cm$^{-1}$, depending on the hydrogen bonding environment of the urethane) and N—H deformation (1530 cm$^{-1}$) (FIG. 2E). These polymers display low glass transition temperatures of ca. 10° C. as measured by differential scanning calorimetry (DSC) and thermal stability similar to most cross-linked PUs, with decomposition onset temperatures greater than 280° C. Dynamic mechanical thermal analysis (DMTA) shows a plateau storage modulus greater than the loss modulus above the glass transition temperature, indicative of the cross-linked architecture. A summary of the characterization of the polyether PUs is provided in TABLE 1.

TABLE 1

Characterization of Polyether Polyurethanes

| Polymer | Gel % | $T_d$ (° C., 5%) | $T_{g, DSC}$ (° C.) | $T_{g, DMTA}$ (° C.) | E' at 110° C. (MPa) | $E_a$ (kJ/mol) | $T_v$ (° C.) |
|---|---|---|---|---|---|---|---|
| DBTDL | 0.75 | 284 | 9 | 5 | 0.95 | 143 ± 2 | 49 |
| Bi(neo)$_3$ | 0.86 | 293 | 10 | 7 | 1.00 | 146 ± 6 | 46 |
| Fe(acac)$_3$ | 0.79 | 294 | 10 | 5 | 1.20 | 146 ± 2 | 54 |

Figure 3G:
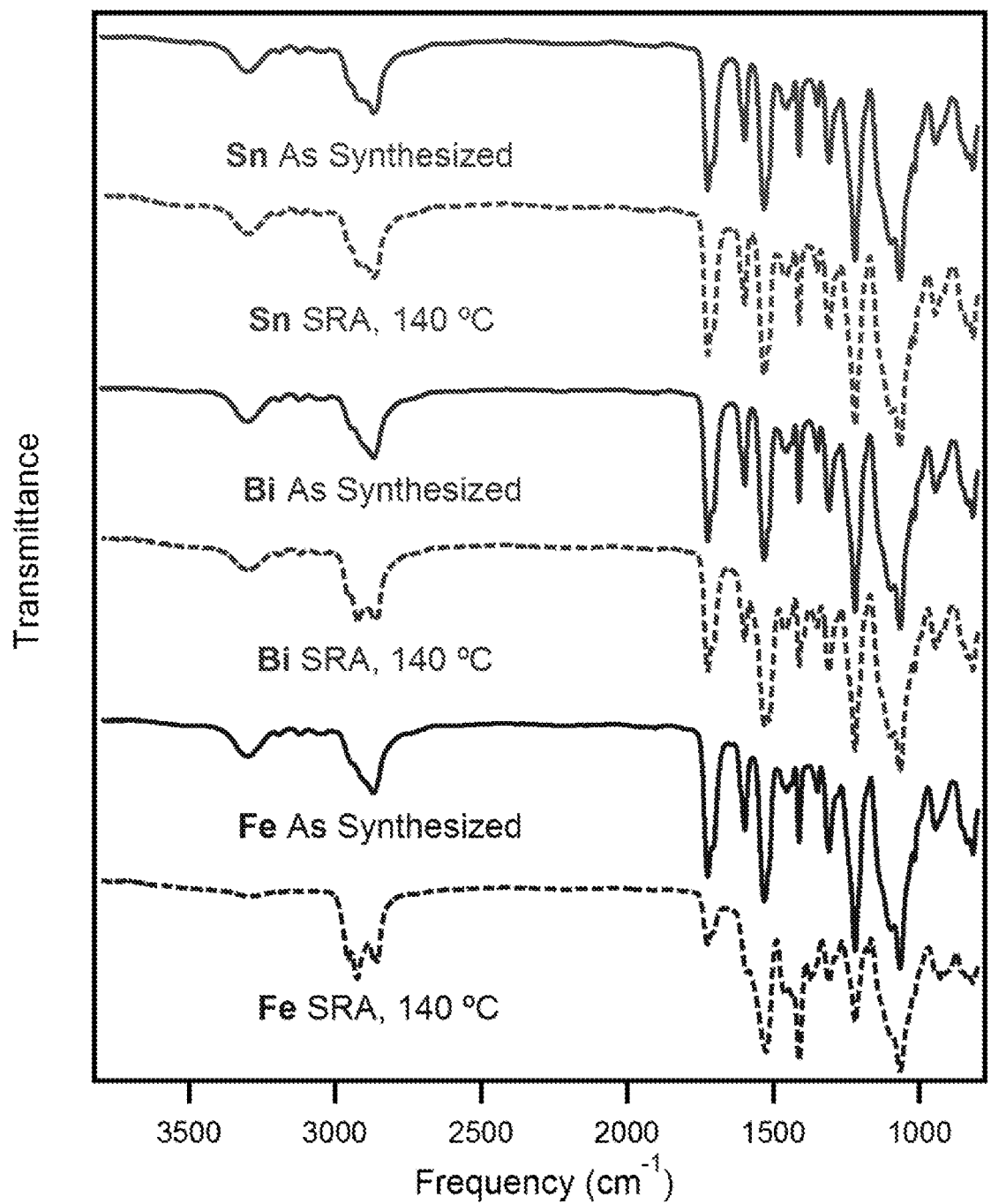
FIG. 3G shows FT-IR spectra of polyether polyurethanes as synthesized (solid) and after stress relaxation analysis at highest temperature measured (dashed).

The rate of urethane exchange reactions at elevated temperatures within these networks were determined by elevated temperature stress relaxation experiments. Samples were equilibrated at a given temperature, a rapid 5% strain was applied, and the relaxation of the stress was monitored; this process was repeated multiple times for a given sample to understand the reproducibility of the process. All samples relaxed stress very rapidly and reproducibly with characteristic relaxation times ($\tau^*$, the time required to relax to 1/e of the initial stress) of less than 40 s for each sample at 140° C. (FIG. 3B-3F). While FT-IR analysis of samples containing Bi and Sn show no change afterwards, consistent with degenerate urethane exchange reactions as the cause of stress relaxation, the samples containing Fe showed marked changes in functional groups present (FIG. 3G), suggesting that side reactions contribute to relaxation in these samples. Fe(III) catalysts have been reported to cause exchange or dehydration reactions of ethers, so we suspect that these side reactions contribute most strongly to the decomposition. Surprisingly, all samples relax stress with similar Arrhenius activation energies (FIG. 3C), which strongly differs from the behavior observed in polyester vitrimers. This may be consistent with a dissociative mechanism, whereby the catalysts rapidly mediate the generation of an equilibrium between bound urethane and isocyanate/alcohol; the resulting relaxation rate is then governed by the equilibrium constant of the urethane dissociation process, which should be relatively unaffected by the presence of catalyst.

Figure 4A:
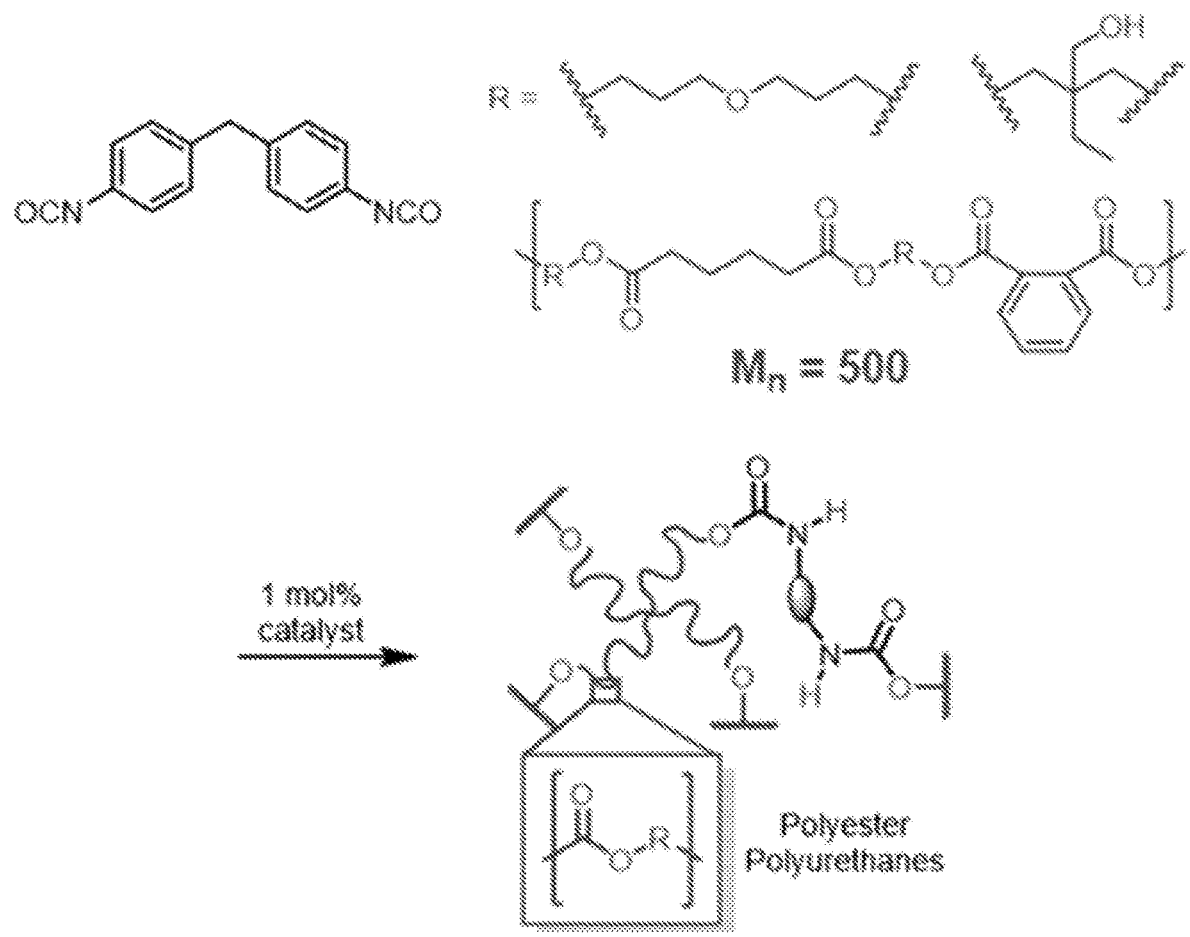
FIG. 4A illustrate the synthesis of polyester PUs.

To determine whether this unexpected behavior was general across multiple classes of PUs, cross-linked polyester PUs were synthesized by reacting MDI with a commercially available polyester oligomer polyol 500 g/mol, —OH functionality 2.5) in the presence of 1 mol % of catalyst (FIG. 4A). A control sample was synthesized in the absence of catalyst to determine its role on the properties of the material. All polymers show complete disappearance of the —NCO functionality by FT-IR spectroscopy (FIG. 4G), and swell in DCM to give relatively high gel fractions (>0.9), suggesting a cross-linked architecture. DSC indicates moderate glass transition temperatures of 45-50° C., and TGA shows thermal stability to temperatures greater than 250° C., even in the presence of catalyst. DMTA shows a rubbery plateau modulus consistent with the expected covalently cross-linked architecture, and all catalysts give similar values of the rubbery storage modulus (3.18-5.39 MPa) and tan δ curves, suggesting that the different catalysts do not significantly affect the polymer curing reaction. A summary of the characterization of the polyester PUs is provided in TABLE 2.

TABLE 2

Characterization of Polyester Polyurethanes

| Polymer | Gel % | $T_d$ (° C., 5%) | $T_{g, DSC}$ (° C.) | $T_{g, DMTA}$ (° C.) | E' at 120° C. (MPa) | $E_a$ (kJ/mol) | $T_v$ (° C.) |
|---|---|---|---|---|---|---|---|
| DBTDL | 87 | 272 | 44 | 53 | 3.23 | 144 ± 3 | 71 |
| Bi(neo)$_3$ | 92 | 282 | 48 | 52 | 3.56 | 148 ± 2 | 73 |
| Fe(acac)$_3$ | 92 | 283 | 49 | 53 | 5.39 | 147 ± 2 | 71 |
| No Cat | 92 | 299 | 37 | 43 | 1.97 | — | — |

Figure 4B:
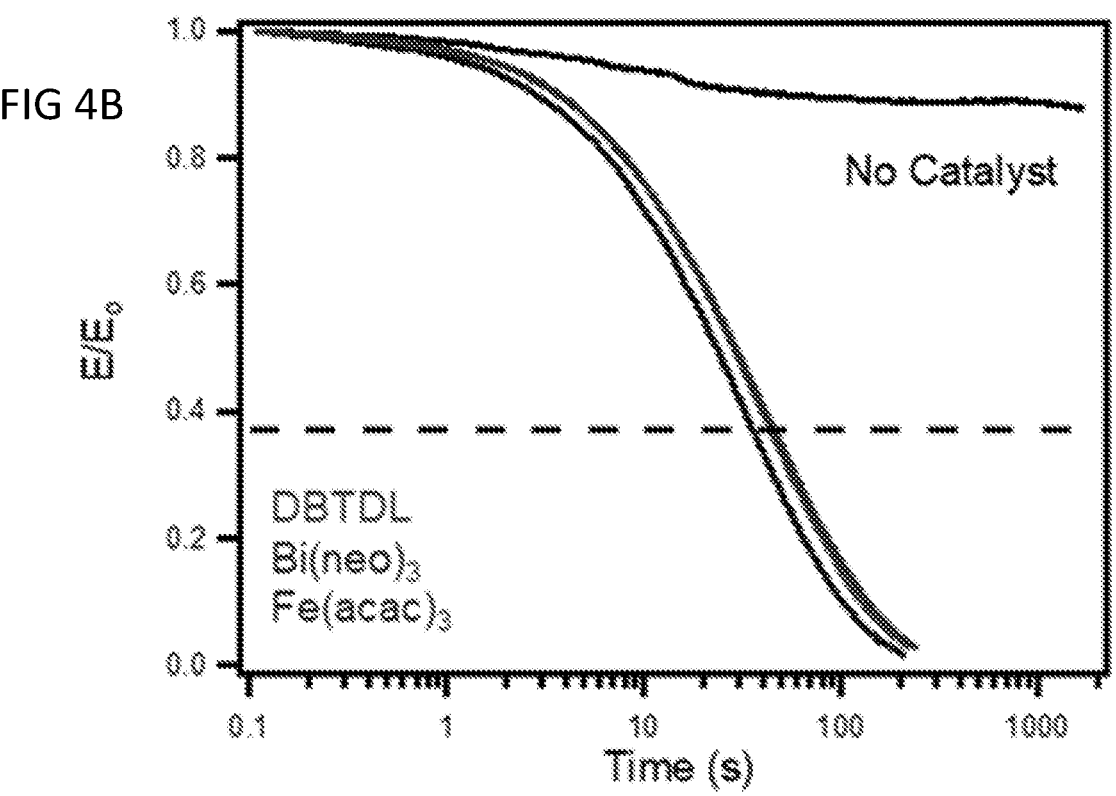
FIG. 4B shows stress relaxation analysis of polyether PUs containing $Bi(neo)_3$ (second from top), DBTDL (third from top), $Fe(acac)_3$ (bottom), or no catalyst (top) performed at 160° C.
Figure 4C:
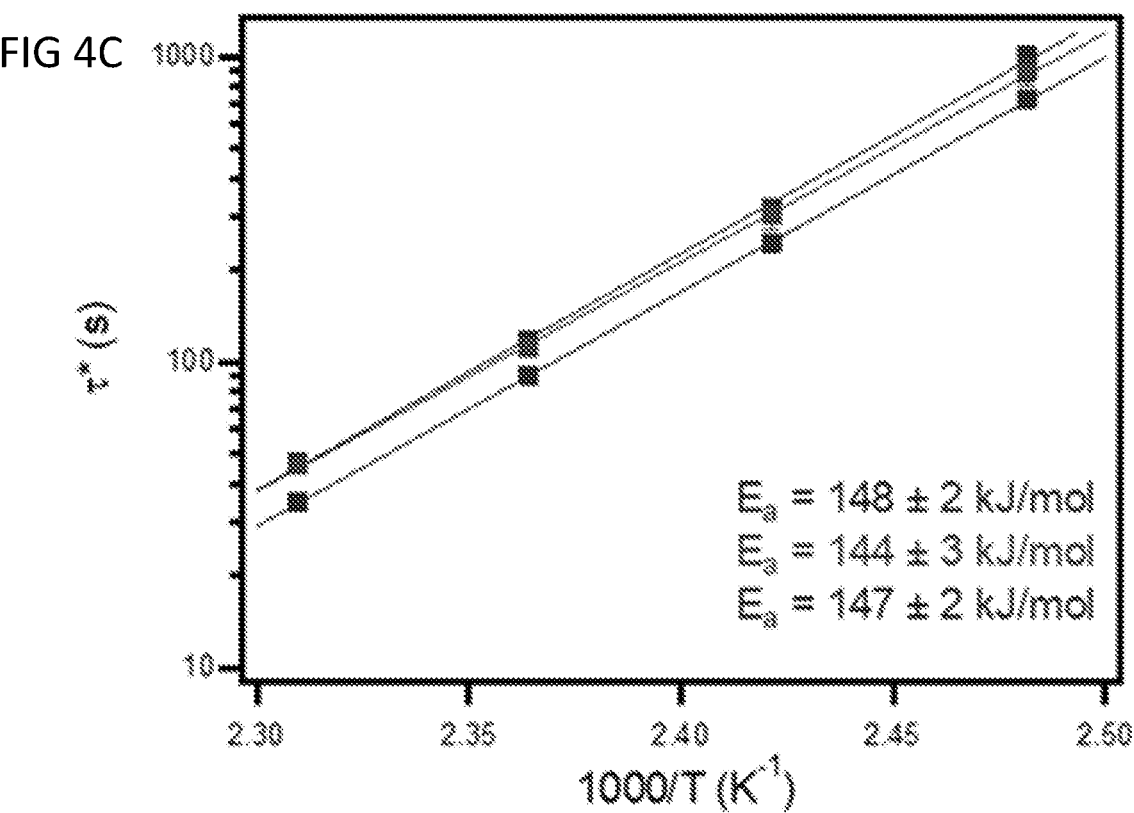
FIG. 4C shows Arrhenius plots of characteristic relaxation time of polyester PUs containing 1 mol % $Bi(neo)_3$ (top; $E_a=148\pm2$ kJ/mol), DBTDL (middle; $E_a=144\pm3$ kJ/mol), and $Fe(acac)_3$ (bottom; $E_a=147\pm2$ kJ/mol).
Figure 4D:
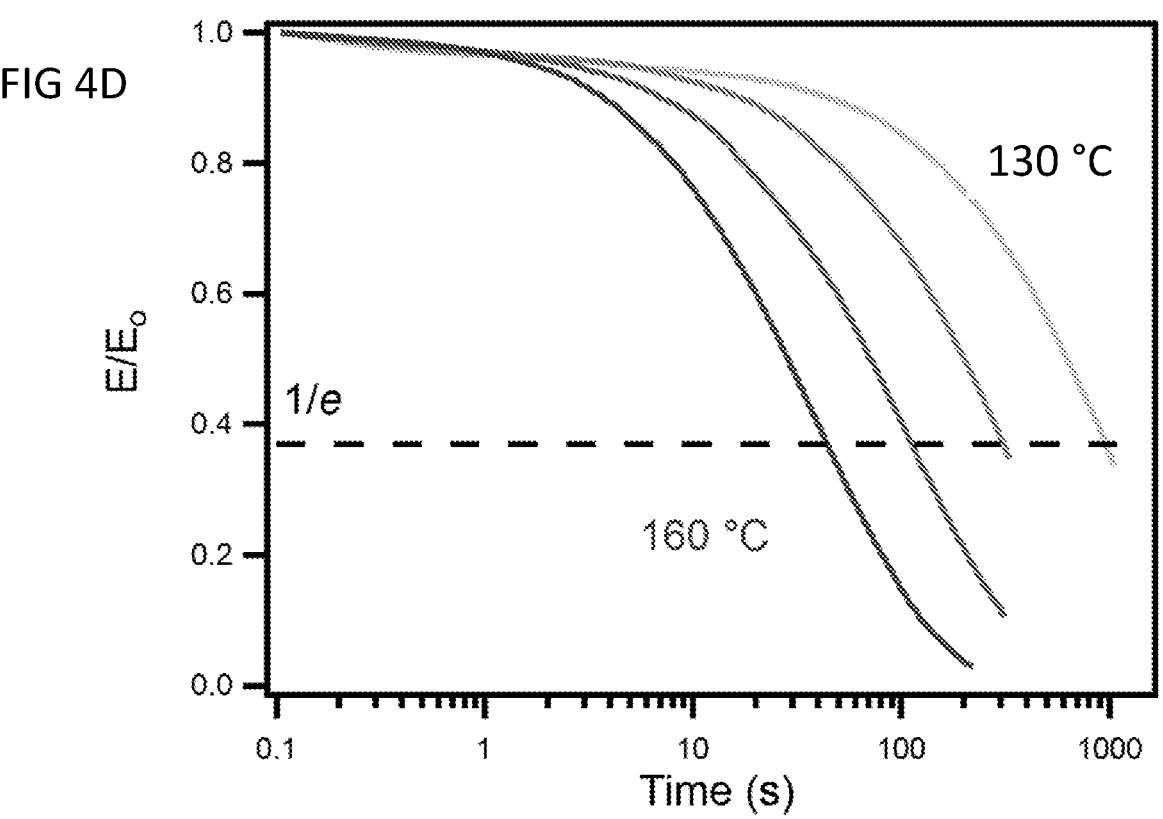
FIG. 4D shows representative stress relaxation curves of MDI polyester PU with 1 mol % DBTDL performed from 130 to 160° C.
Figure 4E:
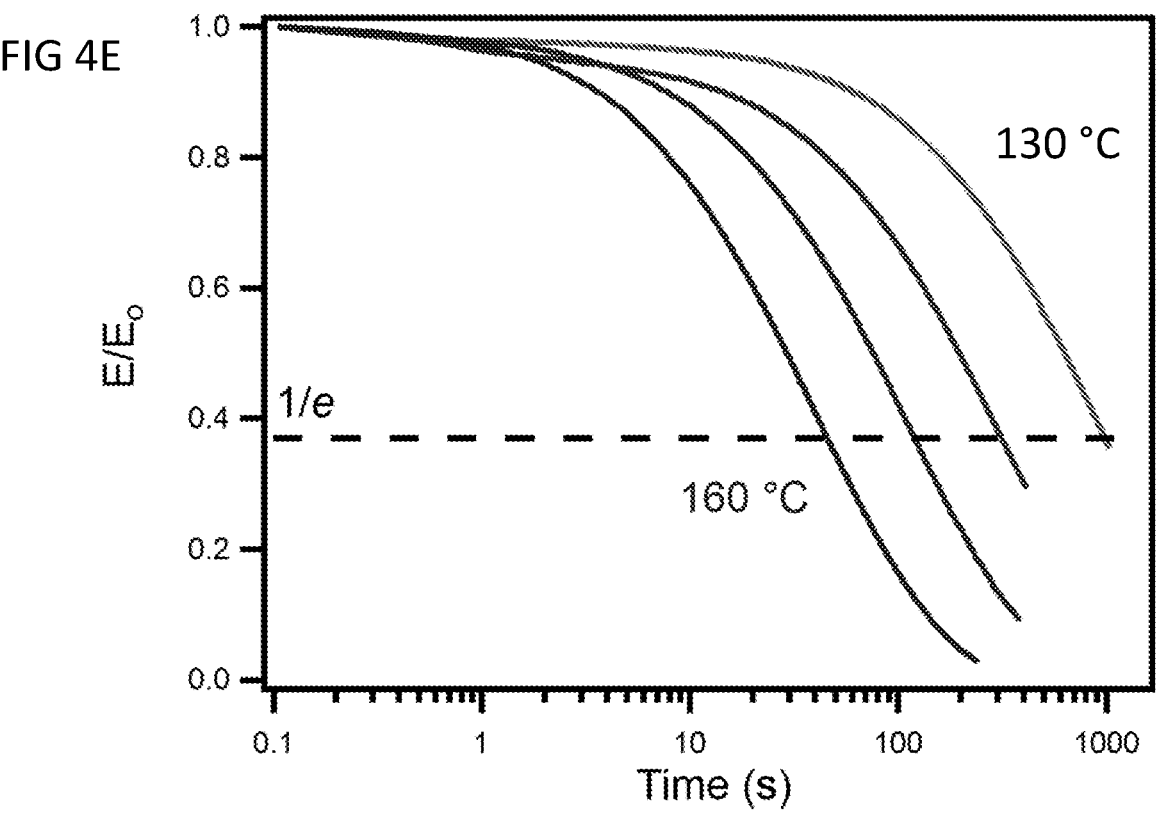
FIG. 4E shows representative stress relaxation curves of MDI polyester PU with 1 mol % $Bi(neo)_3$ performed from 130 to 160° C.
Figure 4G:
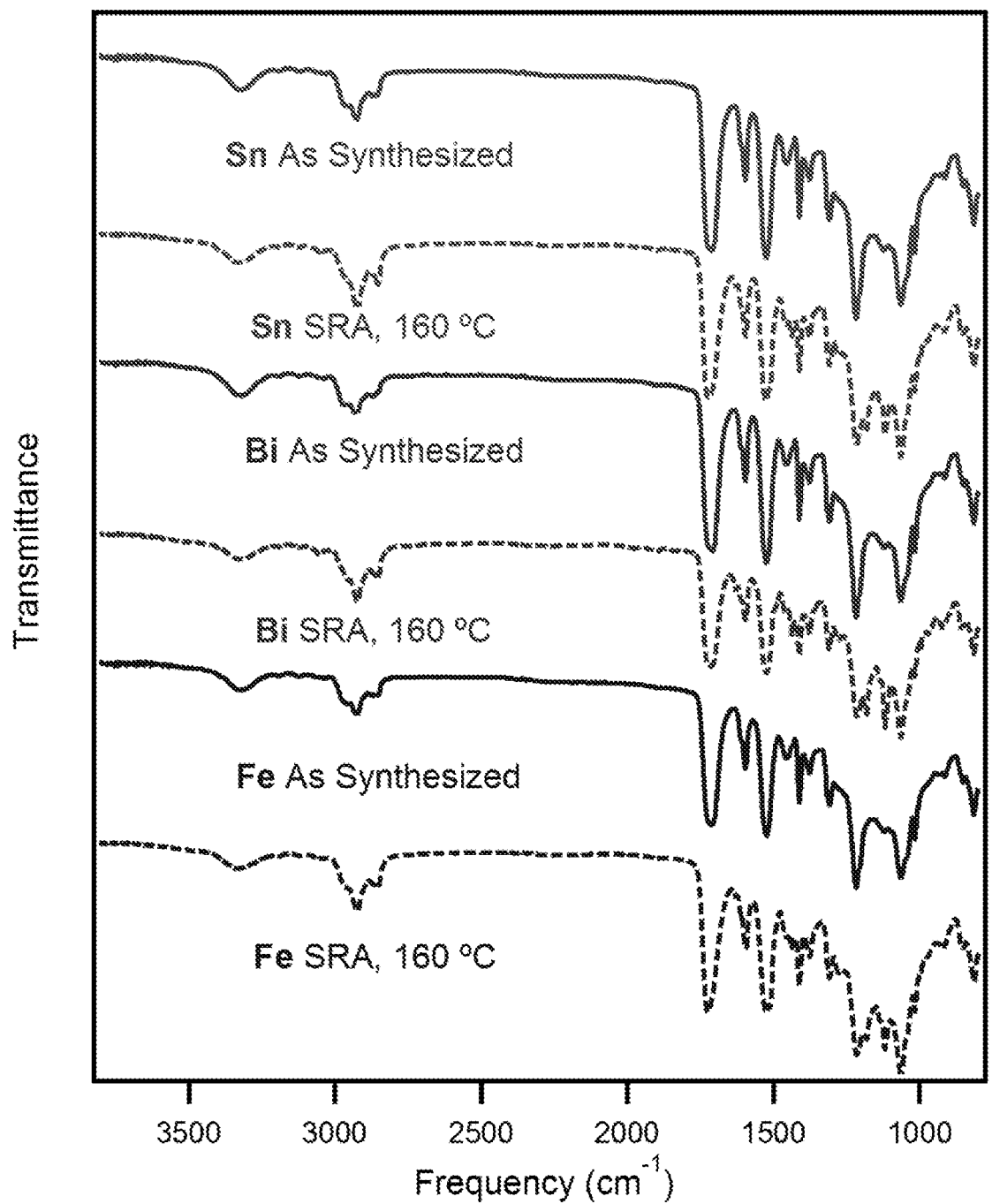
FIG. 4G shows FT-IR spectra of polyester polyurethanes as synthesized (solid) and after stress relaxation analysis at highest temperature measured (dashed).

Elevated temperature stress relaxation experiments were again used to evaluate the dynamic nature of the polymers. In all polymers containing catalyst, rapid, reproducible stress relaxation is observed, with characteristic relaxation times of 35-47 s at 160° C. depending on the catalyst (FIG. 4B). FT-IR analysis of polymers containing each of the three catalysts before and after stress relaxation suggests no chemical changes (FIG. 4G). Remarkably similar rates and Arrhenius activation energies of stress relaxation are observed with all catalysts (FIG. 4C-4F). These activation energies agree quantitatively with those obtained for polyether PU stress relaxation; this provides further support for our hypothesis that the urethane reversion process may be governing relaxation. Samples in which the aromatic polyisocyanate was replaced with an aliphatic isocyanate showed slower relaxation rates and similar activation energies of stress relaxation, consistent with this hypothesis and the higher thermal stability of aliphatic-isocyanate-derived polyurethanes, and suggesting the general applicability of the chosen catalysts to catalyze exchange of any urethane bond ((TABLE 3-4). A control sample synthesized in the absence of catalyst shows little to no stress relaxation at the same temperature (FIG. 4B), indicating that the presence of catalyst is essential for rapid stress relaxation, consistent with our model compound studies and providing support for urethane exchange as the mechanism for relaxation in these materials.

TABLE 3

Characteristic Relaxation Times of MDI Polymers at Various Temperatures

| Polymer | 160° C. | 150° C. | 140° C. | 130° C. | 120° C. | 110° C. |
|---|---|---|---|---|---|---|
| Ether-Sn | | | 22 ± 1 s | 65 ± 2 s | 184 ± 11 s | 587 ± 45 s |
| Ether-Bi | | | 10 ± 1 s | 30 ± 4 s | 77 ± 6 s | 308 ± 38 s |
| Ether-Fe | | | 33 ± 1 s | 101 ± 3 s | 290 ± 8 s | |
| Ester-Sn | 46 ± 2 s | 111 ± 1 s | 305 ± 35 s | 887 ± 88 s | | |
| Ester-Bi | 47 ± 1 s | 117 ± 3 s | 321 ± 9 s | 1006 ± 27 s | | |
| Ester-Fe | 35 ± 1 s | 90 ± 1 s | 246 ± 6 s | 727 ± 35 s | | |

TABLE 4

Characteristic Relaxation Times of HMDI Polymers at Various Temperatures

| Polymer | 190° C. | 180° C. | 170° C. | 160° C. | 150° C. |
|---|---|---|---|---|---|
| Ester-Sn | | 72 ± 2 s | 168 ± 2 s | 418 ± 6 s | 1256 ± 43 s |
| Ester-Bi | | 97 ± 1 s | 226 ± 4 s | 542 ± 8 s | 1409 ± 13 s |
| Ester-Fe | 82 ± 3 s | 197 ± 3 s | 520 ± 22 s | 1089 ± 116 s | |

Figure 5A:
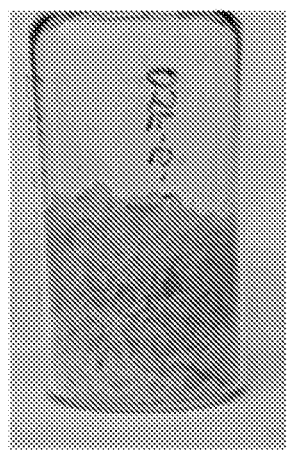
FIG. 5A shows photographs of ground and reprocessed polyester PUs containing 1 mol % $Bi(neo)_3$.
Figure 5A:
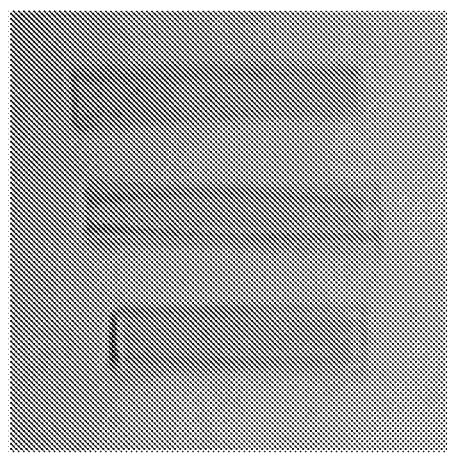
Figure 5B:
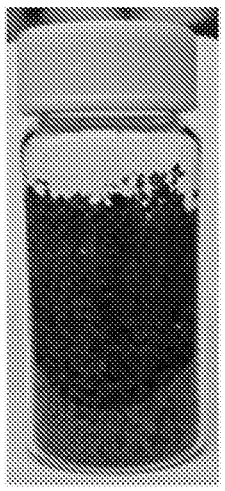
FIG. 5B shows photographs of ground and reprocessed polyester PUs containing 1 mol % $Fe(acac)_3$.
Figure 5B:
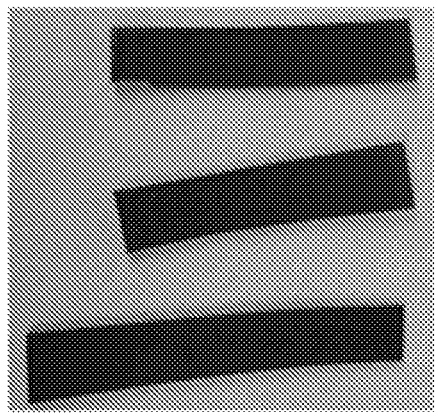
Figure 5C:
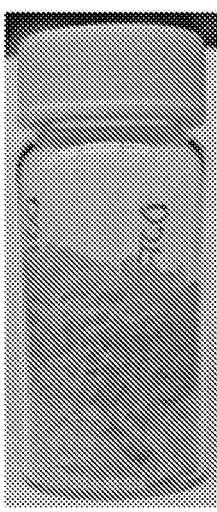
FIG. 5C shows photographs of ground and reprocessed polyester PUs containing 1 mol % DBTDL.
Figure 5C:
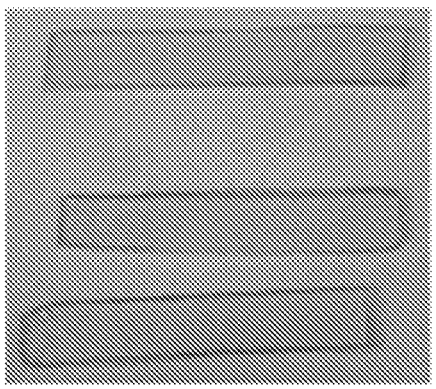
Figure 5D:
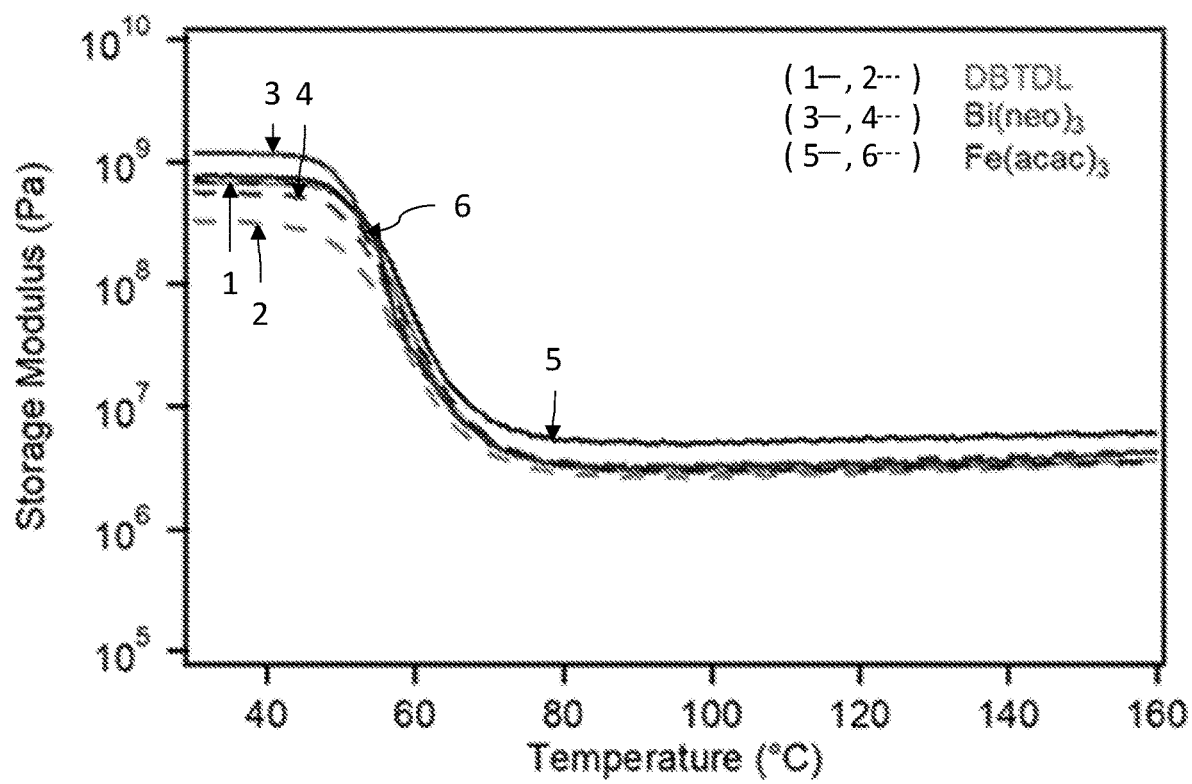
FIG. 5D shows DMTA of as-synthesized PUs (solid) containing DBTDL (1), $Bi(neo)_3$ (3), and $Fe(acac)_3$ (5), and DBTDL (2), $Bi(neo)_3$ (4), and $Fe(acac)_3$ (6) samples after reprocessing for 12 min at 160° C. (dashed).
Figure 5E:
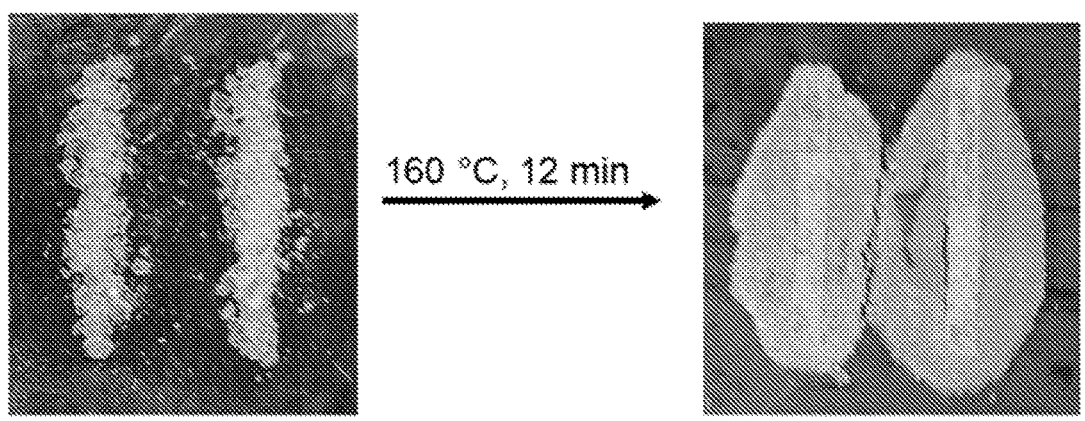
FIG. 5E shows photographs of attempted reprocessing of control sample containing no catalyst via compression molding for 12 minutes at 160° C. Inhomogeneous samples are obtained.
Figure 6A:
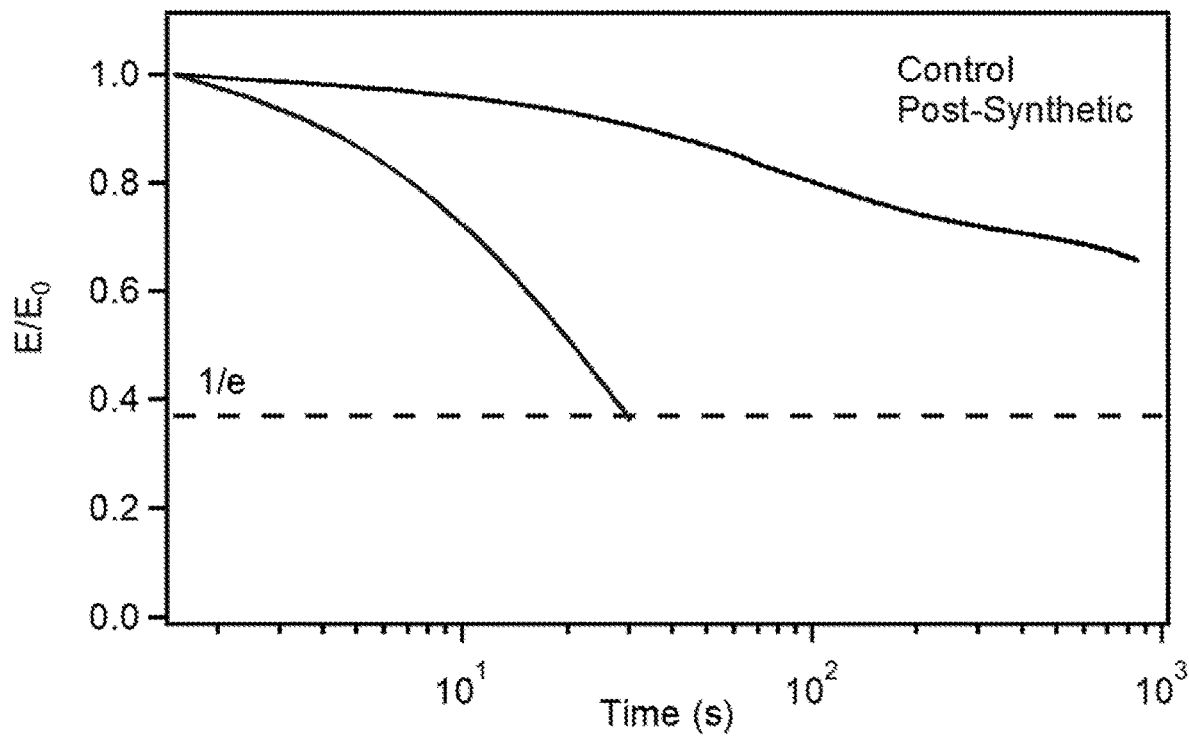
FIG. 6A shows a representative SRA of control PU films without embedded catalyst (top) and post-synthetically treated reprocessed PU film (bottom).
Figure 6B:
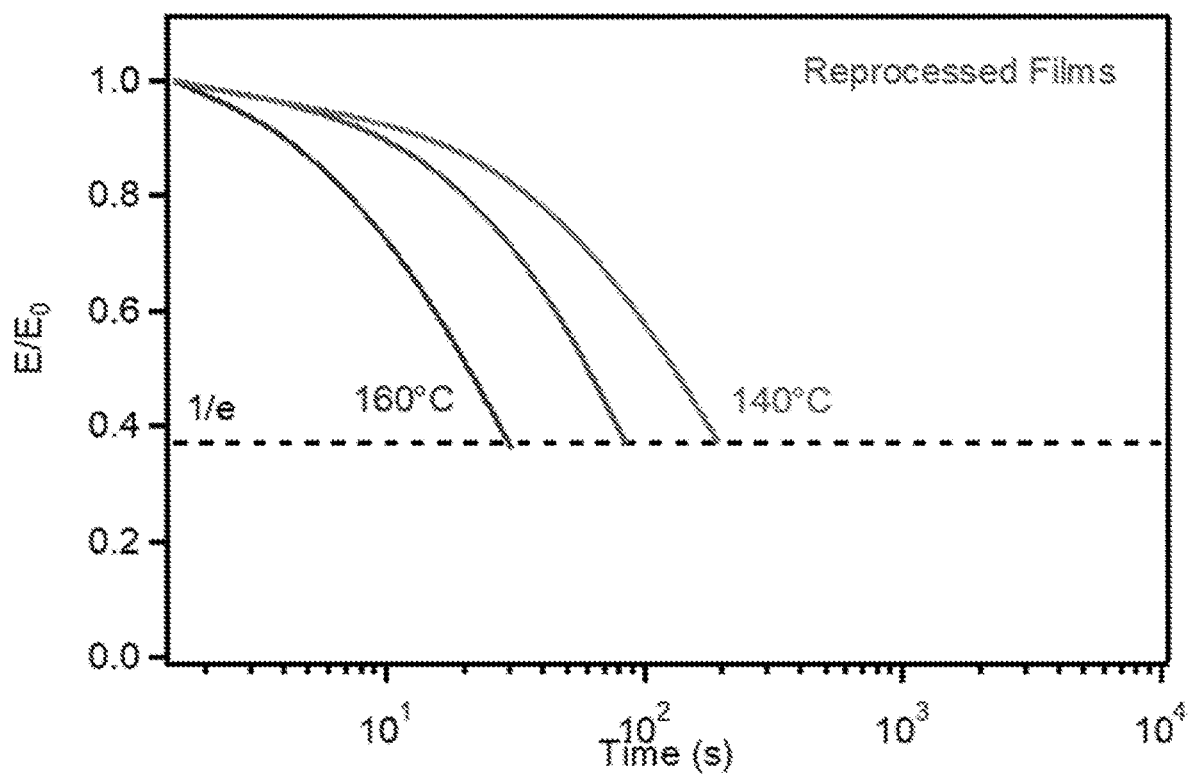
FIG. 6B shows a representative SRA traces of post-synthetically ($Fe(acac)_3$) treated reprocessed PU films from 140-160° C.

The fast and reproducible relaxation dynamics of these materials at elevated temperatures suggest that direct reprocessing of these cross-linked materials should be possible. Polyester PU samples were ground to small pieces, and then reprocessed via compression molding at elevated temperature. In all cases, compression molding samples for 12 minutes at 160° C. gave homogeneous samples with similar properties to the virgin materials (FIG. 5A-5C). DMTA of the reprocessed polymers indicated similar glass transition temperatures and plateau moduli of the reprocessed Bi and Sn samples and moderate cross-link density recovery of Fe samples (Sn 92% recovery, Bi 105% recovery, Fe 57% recovery) (FIG. 5D). Tensile testing of pristine samples and samples after reprocessing once indicated moderate recovery of tensile strengths for all catalysts (39-67%) (TABLES 5-7).

TABLE 5

Tensile Testing of Bi(neo)$_3$ Polyester Polyurethanes Before and After Reprocessing

| Bi(neo)$_3$ | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 53.5 ± 1.5 | 4.2 ± 0.2 | 1.70 ± 0.05 | 2.24 ± 0.22 | 64.7 ± 9.5 | 6.44 ± 0.41 |
| RP1 | 23.9 ± 5.7 | 1.9 ± 0.4 | 1.48 ± 0.19 | 0.69 ± 0.10 | 29.6 ± 5.2 | 3.37 ± 0.35 |
| RP2 | 24.2 ± 8.6 | 1.5 ± 0.5 | 1.63 ± 0.11 | | | |

TABLE 6

Tensile Testing of Fe(acac)$_3$ Polyester Polyurethanes Before and After Reprocessing

| Fe(acac)$_3$ | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 35.8 ± 5.1 | 2.1 ± 0.4 | 1.78 ± 0.04 | 1.10 ± 0.10 | 61.7 ± 14.0 | 2.25 ± 0.82 |
| RP1 | 13.8 ± 3.7 | 0.9 ± 0.2 | 1.65 ± 0.13 | 0.36 ± 0.12 | 23.9 ± 9.7 | 2.26 ± 0.27 |
| RP2 | 20.6 ± 4.5 | 1.7 ± 0.4 | 1.39 ± 0.10 | | | |

TABLE 7

Tensile Testing of DBTDL Polyester Polyurethanes Before and After Reprocessing

| DBTDL | Room Temperature | | | Elevated Temperature (90° C.) | | |
|---|---|---|---|---|---|---|
| | $\sigma_b$ (MPa) | $\varepsilon_b$ (%) | E (GPa) | $\sigma_b$ (MPa) | $\varepsilon_b$ (%) | E (MPa) |
| AS | 49.7 ± 1.6 | 4.8 ± 1.0 | 1.57 ± 0.09 | 0.72 ± 0.12 | 103.1 ± 7.9 | 1.26 ± 0.33 |
| RP1 | 32.7 ± 8.4 | 3.0 ± 1.2 | 1.35 ± 0.07 | 0.81 ± 0.29 | 72.6 ± 9.2 | 1.56 ± 0.23 |
| RP2 | 16.1 ± 0.5 | 5.2 ± 1.3 | 0.76 ± 0.09 | | | |

Figure 7:
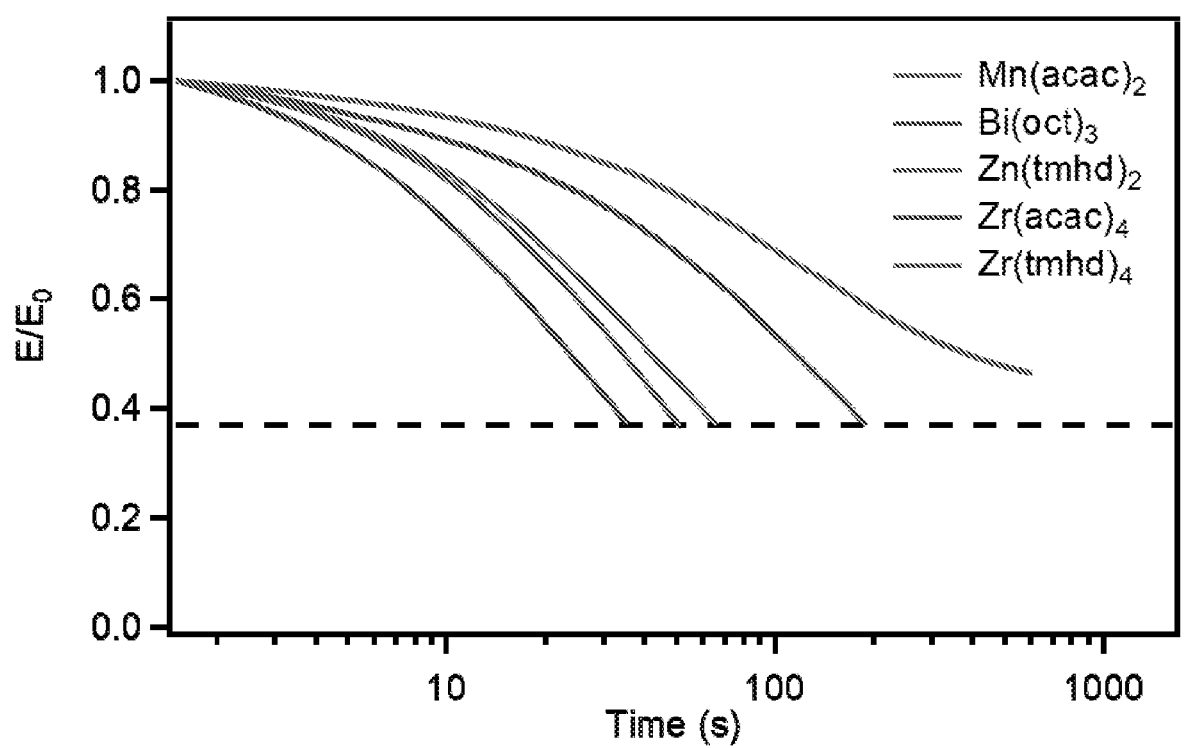
FIG. 7 shows representative SRA traces at 160° C. of synthesized PU film with various different Lewis acid catalysts. Curves are from bottom to top: $Bi(oct)_3$, $Zr(tmhd)_4$, $Mn(acac)_2$, $Zr(acac)_4$, and $Zn(tmhd)_2$.

Films synthesized containing other Bi, Zn, Zr, and Mn-based catalysts also show rapid relaxation (FIG. 7), demonstrating the utility of a variety of Lewis acid catalysts for the development of reprocessable PU-catalyst compositions.

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Materials and General Methods

Materials. All reagents were purchased from Sigma-Aldrich or Fisher Scientific. Polyols were dried at 90° C. under 20 mTorr vacuum for at least 24 hours prior to use. All other reagents were used without further purification unless otherwise specified. Dichloromethane ($CH_2Cl_2$) and tetrahydrofuran (THF) were purchased from Fisher Scientific and purified using a custom-built alumina-column based solvent purification system. Other solvents were purchased from Fisher Scientific and used without further purification.

Infrared spectra were recorded on a Thermo Nicolet iS10 equipped with a ZnSe ATR attachment. Spectra were uncorrected.

Solution-phase NMR spectra were recorded on a Varian 400 MHz or an Agilent DD MR-400 400 MHz spectrometer using a standard $^1$H/X Z-PFG probe at ambient temperature.

Thermogravimetric analysis (TGA) was performed on a Mettler Toledo SDTA851 Thermogravimetric Analysis System using 5-10 mg of sample. Samples were heated under a nitrogen atmosphere at a rate of 5° C./min from 25° C. to 600° C.

Differential scanning calorimetry (DSC) was performed on a Mettler Toledo DSC822 Differential Scanning calorimeter. Samples (5-10 mg) were heated at a rate of 10° C./min to at least 90° C. to erase thermal history, cooled to −30° C. at 10° C./min, and then heated to at least 110° C. All data shown are taken from the second heating ramp. The glass transition temperature ($T_g$) was calculated from the maximum value of the derivative of heat flow with respect to temperature.

Dynamic mechanical thermal analysis (DMTA) was performed on a TA Instruments RSA-G2 analyzer (New Castle, DE) using rectangular (ca. 0.75 mm (T)×5 mm (W)×20 mm (L) and a gauge length of 10 mm). The axial force was adjusted to 0 N and a strain adjust of 30% was set with a minimum strain of 0.05%, a maximum strain of 5%, and a maximum force of 1 N in order to prevent the sample from buckling or going out of the specified strain. Furthermore, a force tracking mode was set such that the axial force was twice the magnitude of the oscillation force. A temperature ramp was then performed from 30° C. to 200° C. at a rate of 5° C./min, with an oscillating strain of 0.05% and an angular frequency of 6.28 rad s$^{-1}$ (1 Hz). The $T_g$ was calculated from the maximum value of the loss modulus (E").

Stress relaxation analysis (SRA) was performed on a TA Instruments RSA-III analyzer (New Castle, DE) using rectangular films (ca. 1.0 mm (T)×5 mm (W)×15 mm (L) and a Gauge length of 8 mm). The SRA experiments were performed with strain control at specified temperature (110 to 160° C.). The samples were allowed to equilibrate at this temperature for approximately 10 minutes, after which the axial force was then adjusted to 0 N. Each sample was then subjected to an instantaneous 5% strain. The stress decay was monitored, while maintaining a constant strain (5%), until the stress relaxation modulus had relaxed to at least 37% (1/e) of its initial value. This was performed three consecutive times for each sample. The activation energy ($E_a$) and freezing transition temperature ($T_v$) were determined using the methodology in literature. [Capelot, M. et al., ACS Macro Lett. 2012, 1, 789-792; Brutman, J. P. et al., ACS Macro Lett. 2014, 3, 607-610]

Material reprocessing. To reprocess the materials, the polymer was ground into small pieces using a Cuisinart Grind Central© coffee grinder. The ground polymer was spread between two aluminum plates in a 1.0 mm thick aluminum mold. This assembly was placed in PHI 30-ton manual press preheated to the desired temperature and allowed to thermally equilibrate for 1 minute. The material was compressed at 5-10 MPa of pressure for 30 s, then the pressure was released, and this was repeated 2× to enable removal of air bubbles. The material was then compressed at 5-10 MPa for 30 minutes. The homogenous polymer was removed from the mold, and specimens for DMTA were cut using a straight-edge blade on a 150° C. hot plate. Reprocessed materials may be indicated by the designation "RP#" where # indicates the number of times the material has been reprocessed.

Synthetic Procedures

Scheme 1. Synthesis of N-phenyl-O-octyl urethane

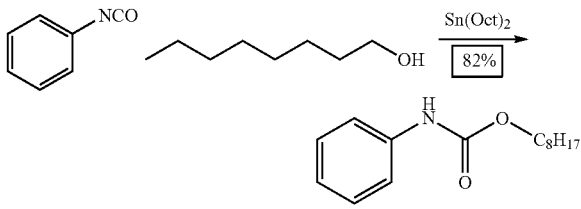

Synthesis of N-phenyl-O-octyl urethane: To a flame-dried round-bottom flask under nitrogen atmosphere was added 1-octanol (2.19 g, 2.65 ml, 16.8 mmol) and anhydrous tetrahydrofuran (20 mL). A solution of Sn(Oct)$_2$ (130 mg, 0.34 mmol, 2 mol %) dissolved in anhydrous tetrahydrofuran (1 mL) was added, followed by addition of phenyl isocyanate (2.00 g, 1.82 ml, 16.8 mmol) using a syringe. The resulting solution was stirred at room temperature for 24 h, and solvent was removed at reduced pressure to yield a white solid. The crude solid was chromatographed on silica gel in 20% ethyl acetate/hexanes to yield the product as a white solid (3.4 g, 82% yield). $^1$H NMR (400 MHz, CDCl$_3$) δ 7.38 (d, J=8.0 Hz, 2H), 7.35-7.23 (m, 2H), 7.05 (tt, J=7.1, 1.2 Hz, 1H), 6.56 (br s, 1H), 4.16 (t, J=6.7 Hz, 2H), 1.71-1.63 (m, 2H), 1.43-1.23 (m, 10H), 0.89 (t, J=7.8 Hz, 3H). $^{13}$C NMR (100 MHz, CDCl$_3$) δ 153.7, 138.0, 128.9, 123.2, 118.5, 65.4, 31.7, 29.19, 29.15, 28.9, 25.8, 22.6, 14.0. IR (neat, ATR) 3304, 2956, 2920, 2853, 1698, 1599, 1544, 1444, 1236, 1055, 747 cm$^{-1}$.

Scheme 2. Synthesis of N-tolyl-O-decyl urethane

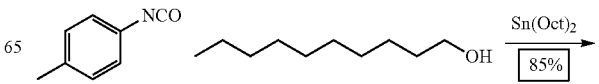

-continued

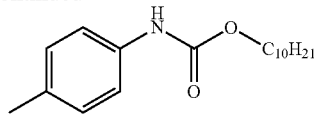

Synthesis of N-tolyl-O-decyl urethane: To a flame-dried round-bottom flask under nitrogen atmosphere was added 1-decanol (2.66 g, 3.20 ml, 16.8 mmol) and anhydrous tetrahydrofuran (20 mL). A solution of Sn(Oct)$_2$ (130 mg, 0.34 mmol, 2 mol %) dissolved in anhydrous tetrahydrofuran (1 mL) was added, followed by addition of p-tolyl isocyanate (2.24 g, 2.12 ml, 16.8 mmol) using a syringe. The resulting solution was stirred at room temperature for 24 h, and solvent was removed at reduced pressure to yield a white solid. The crude solid was chromatographed on silica gel in 20% ethyl acetate/hexanes to yield the product as a white solid (4.16 g, 85% yield). $^1$H NMR (400 MHz, CDCl$_3$) δ 7.28-7.22 (m, 2H), 7.10 (d, J=8.3 Hz, 2H), 6.49 (br s, 1H), 4.14 (t, J=6.7 Hz, 2H), 2.30 (s, 3H), 1.72-1.60 (m, 2H), 1.44-1.24 (m, 14H), 0.92-0.84 (m, 3H). $^{13}$C NMR (100 MHz, CDCl$_3$) δ 153.8, 135.4, 132.8, 129.4, 118.7, 65.3, 31.9, 29.51, 29.50, 29.27, 29.25, 28.9, 25.8, 22.6, 20.7, 14.1. IR (neat, ATR) 3327, 2919, 2851, 1696, 1596, 1531, 1314, 1235, 1071, 814 cm$^{-1}$.

Scheme 3. Synthesis of Cross-linked Polyether Polyurethanes

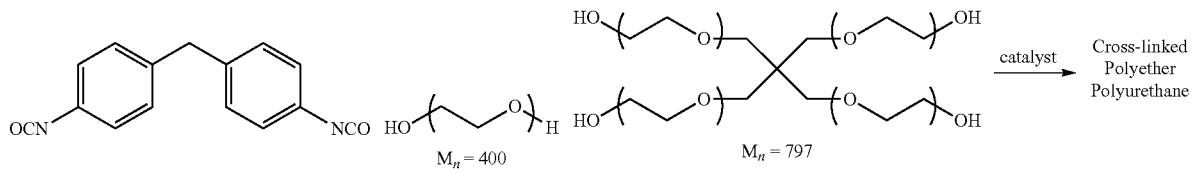

Synthesis of Cross-linked PUs: To a vial was added pentaerythritol ethoxylate (15/4 EO/OH, average M$_n$≈797 g/mol, 150 mg, 0.19 mmol), polyethylene glycol (M$_n$≈400 g/mol, 1.500 g, 3.75 mmol), and 7.5 ml anhydrous CH$_2$Cl$_2$. Solid 4,4'-methylenebis(phenyl isocyanate) (MDI) (1.033 g, 4.13 mmol) was added, and the solution was vortexed until the MDI was totally dissolved. An aliquot of a solution of catalyst (50-100 mg/ml in anhydrous CH$_2$Cl$_2$) was added to give a total concentration of 1 mol % catalyst to total —NCO functionality. The resulting solution was vortexed for 20 seconds, then poured into aluminum pans (75 mm D×15 mm H), covered with aluminum foil, and allowed to stand at room temperature for 16-24 h. The resulting films were cut & heated at 80° C. under 20 mtorr vacuum for 48 h. Indistinguishable FT-IR spectra were obtained with samples containing different catalysts. FT-IR (solid, ATR) 3299 (N—H stretch), 2868, 1725-1706 (C=O stretch), 1598, 1532 (N—H deformation), 1412, 1309, 1220, 1067, 946, 816, 768 cm$^{-1}$.

Scheme 4: Synthesis of Cross-linked Polyester Polyurethanes

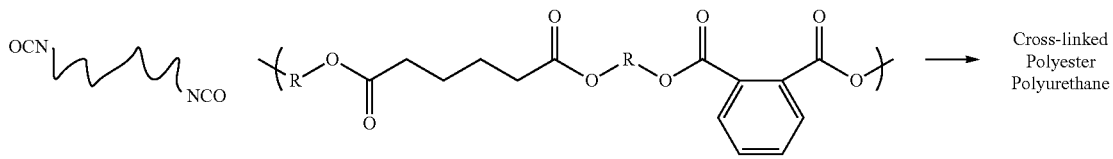

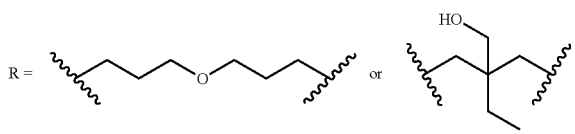

Synthesis of Crosslinked Polyester Polyurethanes with Catalyst: To a vial was added poly[trimethylolpropane/di(propylene glycol)-alt-adipic acid/phthalic anhydride], polyol (200 eq. wt., 3.60 g, 18.0 mmol —OH) and dissolved in 12.0 ml anhydrous $CH_2Cl_2$. Solid 4,4'-methylenebis(phenyl isocyanate) (MDI) (2.253 g, 9.0 mmol) or liquid hexamethylene diisocyanate (HMDI) was added (1.514 g, 9.0 mmol), and the solution was vortexed until the isocyanate was totally dissolved. An aliquot of a solution of catalyst (50-100 mg/ml in anhydrous $CH_2Cl_2$) was added to give a total concentration of 1 mol % catalyst to total —NCO functionality. The resulting solution was vortexed for 60 seconds, then the mixtures were poured into an aluminum pan (104 mm D×15 mm H), covered with aluminum foil, and allowed to stand at room temperature for 16-24 h. The resulting films were cut & heated at 80° C. under 20 mtorr vacuum for 48 h. Indistinguishable FT-IR spectra were obtained with samples containing different catalysts.

MDI polyester PU: FT-IR (solid, ATR) 3326 (N—H stretch), 2933, 1716-1705 (C=O stretch), 1597, 1525 (N—H deformation), 1412, 1309, 1219, 1066, 1017, 816, 766 $cm^{-1}$.

HMDI polyester PU: FT-IR (solid, ATR) 3349 (N—H stretch), 2917, 2850, 1716 (C=O stretch), 1521 (N—H deformation), 1455, 1378, 1258, 1069, 1019, 801, 703 $cm^{-1}$.

Synthesis of Catalyst-Free Cross-linked Polyester Polyurethane: To a vial was added poly[trimethylolpropane/di(propylene glycol)-alt-adipic acid/phthalic anhydride], polyol (200 eq. wt., 4.224 g, 21.1 mmol —OH) and dissolved in 8.0 ml anhydrous toluene. Solid 4,4'-methylenebis(phenyl isocyanate) (2.643 g, 10.56 mmol) was added, and the solution was heated to 60° C. until fully dissolved. The resulting mixture was vortexed for 30 s, poured into an aluminum pan (104 mm D×15 mm H), covered with aluminum foil, and heated at 60° C. for 18 h. The resulting polymer was post-cured at 100° C. for 4 h, then 140° C. for 2 h, then 80° C. under vacuum for 12 h to ensure full curing and removal of solvent. FT-IR (solid, ATR) 3326 (N—H stretch), 2933, 1716-1705 (C=O stretch), 1597, 1525 (N—H deformation), 1412, 1309, 1219, 1066, 1017, 816, 766 $cm^{-1}$.

Post-synthetic introduction of Catalyst to PU: One gram of model PU was suspended in 10 mL of benchtop dichloromethane. To the suspension, $Bi(neo)_3$ (300 mg), DBTDL (300 mg), or $Fe(acac)_3$ (100 mg) was added and the resulting catalyst solution was stirred overnight. The resulting swollen polymer was filtered, collected, and placed in a vacuum oven at 90° C. at 20 mTorr for 24 hours to remove residual dichloromethane. The PU film was processed as collected.

The invention claimed is:

1. A method for reprocessing a polyurethane composition, the method comprising providing a polyurethane composition, heating the polyurethane composition to an effective bond-exchange temperature, and applying mechanical force to the polyurethane composition for an effective bond-exchange time,
wherein the polyurethane composition comprises a network polymer and a polyurethane exchange catalyst post-synthetically impregnated into the network polymer;
wherein the network polymer comprises a dynamic network formed from an isocyanate constitutional unit and a second constitution unit having a hydroxyl group capable of reacting with an isocyanate group of the isocyanate constitutional unit to form a urethane bond;
wherein the polyurethane exchange catalyst comprises a metal selected from Bi, Fe, Zr, Ti, Hf, Al, Zn, Cu, Ni, Co, Mn, V, Sc, Y, Ce, or Mo and a ligand coordinated with the metal atom;
and
wherein a mol % of the polyurethane exchange catalyst to total isocyanate functionality is less or equal to 5 mol %.

2. The method of claim 1, wherein the effective bond-exchange temperature is less than or equal to 200° C.

3. The method of claim 2, wherein the effective bond-exchange temperature is less than or equal to 160° C.

4. The method of claim 1, wherein the effective bond-exchange time is less than or equal to 30 minutes.

5. The method of claim 1 further comprising the mechanically processing the provided polyurethane composition prior to heating or mechanically processing the network polymer prior to impregnation.

6. The method of claim 5, wherein mechanically processing the provided polyurethane composition comprises grinding the provided polyurethane composition.

7. The method of claim 1, wherein the polyurethane exchange catalyst does not comprise Sn.

8. A method for reprocessing a polyurethane composition, the method comprising impregnating a polyurethane exchange catalyst into a network polymer, heating the polyurethane composition to an effective bond-exchange temperature, and applying mechanical force to the polyurethane composition for an effective bond-exchange time, wherein the network polymer comprises a dynamic network formed from an isocyanate constitutional unit and a second constitution unit having a hydroxyl group capable of reacting with an isocyanate group of the isocyanate constitutional unit to form a urethane bond;
wherein the polyurethane exchange catalyst comprises a metal selected from Bi, Fe, Zr, Ti, Hf, Al, Zn, Cu, Ni, Co, Mn, V, Sc, Y, Ce, or Mo and a ligand coordinated with the metal atom;
and
wherein a mol % of the polyurethane exchange catalyst to total isocyanate functionality is less or equal to 5 mol %.

9. The method of claim 8, wherein the catalyst comprises $Bi(neo)_3$, $Fe(acac)_3$, $Ti(OiPr)_2(acac)_2$, $Hf(acac)_4$, $Zr(acac)_4$, $Mn(acac)_2$, $Bi(oct)_3$, $Zn(tmhd)_2$, $Zr(tmhd)_4$, or any combination thereof.

10. The method of claim 8, wherein the catalyst is $Bi(neo)_3$.

11. The method of claim 8, wherein the catalyst is $Fe(acac)_3$.

12. The method of claim 8, wherein the second constitutional unit is a prepolymer molecule comprising a polyether, a polyester, a polycarbonate, a polyacrylate, a polyolefin, a polybutadiene, a polysulfide, or a polysiloxane.

13. The method of claim 12, wherein the second constitutional unit comprises a polyether.

14. The method of claim 12, wherein the second constitutional unit comprises a polyester.

15. The method of claim 8, wherein the second constitutional unit is a branch unit having at least three hydroxyl groups each capable of reacting with the isocyanate group of the first constitutional unit to form the urethane bond.

16. The method of claim 15, wherein the second constitutional unit further comprises one or more molecules selected from a polyether, a polyester, a polycarbonate, a polyacrylate, a polyolefin, a polybutadiene, a polysulfide, a polysiloxane, a plant-based oil, an alcohol, or an amine.

17. The method of claim 8, wherein the isocyanate constitutional unit is an aromatic isocyanate constitutional unit.

18. The method of claim 8, wherein the effective bond-exchange temperature is less than or equal to 200° C.

19. The method of claim 8, wherein the effective bond-exchange time is less than or equal to 30 minutes.

20. The method of claim 8 further comprising the mechanically processing the provided polyurethane composition prior to heating or mechanically processing the network polymer prior to impregnation.

21. The method of claim 8, wherein the polyurethane exchange catalyst does not comprise Sn.

* * * * *